(12) United States Patent
Yan

(10) Patent No.: US 11,632,617 B2
(45) Date of Patent: *Apr. 18, 2023

(54) METHOD, APPARATUS AND DEVICE FOR SYNCHRONOUSLY PLAYING AUDIO

(71) Applicant: SHENZHEN GOODIX TECHNOLOGY CO., LTD., Shenzhen (CN)

(72) Inventor: Ke Yan, Shenzhen (CN)

(73) Assignee: SHENZHEN GOODIX TECHNOLOGY CO., LTD., Shenzen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,029

(22) Filed: Dec. 10, 2021

(65) Prior Publication Data

US 2022/0141568 A1 May 5, 2022

Related U.S. Application Data

(63) Continuation of application No. 17/184,391, filed on Feb. 24, 2021, now Pat. No. 11,240,586, which is a
(Continued)

(51) Int. Cl.
*H04R 1/10* (2006.01)
*H04W 4/80* (2018.01)
(Continued)

(52) U.S. Cl.
CPC .......... *H04R 1/1041* (2013.01); *G06F 3/162* (2013.01); *H04R 1/1016* (2013.01); *H04W 4/80* (2018.02);
(Continued)

(58) Field of Classification Search
CPC ..... H04R 1/1041; H04R 1/1016; H04W 4/80; H04W 56/001; G06F 3/162
See application file for complete search history.

(56) References Cited

U.S. PATENT DOCUMENTS

| | | | |
|---|---|---|---|
| 10,200,803 B1 | 2/2019 | Tong et al. | |
| 2005/0130656 A1* | 6/2005 | Chen ................. | H04W 36/0058 455/436 |

(Continued)

FOREIGN PATENT DOCUMENTS

| | | |
|---|---|---|
| CN | 202772917 | 3/2013 |
| CN | 104320843 A | 1/2015 |

(Continued)

*Primary Examiner* — Simon King
(74) *Attorney, Agent, or Firm* — Emerson Thomson Bennett; Roger D. Emerson, Esq.

(57) ABSTRACT

A method, apparatus and device for synchronously playing audio are provided. The method includes: acquiring status information of a Bluetooth controller in the first audio playing device and Bluetooth time from the Bluetooth controller, and determining native Bluetooth time of the first audio playing device based on the status information and the Bluetooth time acquired from the Bluetooth controller; estimating, based on the native Bluetooth time of the first audio playing device and offset time of the native Bluetooth time of the first audio playing device relative to native Bluetooth time of a second audio playing device or native Bluetooth time of an audio providing device, absolute time of the second audio playing device or absolute time of the audio providing device; and playing an audio signal provided by the audio providing device synchronously with the second audio playing device based on the estimated absolute time.

20 Claims, 8 Drawing Sheets

Related U.S. Application Data continuation of application No. PCT/CN2020/126675, filed on Nov. 5, 2020.

(51) Int. Cl.
*H04W 56/00* (2009.01)
*G06F 3/16* (2006.01)

(52) U.S. Cl.
CPC ....... *H04W 56/001* (2013.01); *H04R 2420/07* (2013.01)

(56) References Cited

U.S. PATENT DOCUMENTS

| | | |
|---|---|---|
| 2005/0258806 A1 | 11/2005 | Janik et al. |
| 2009/0325492 A1 | 12/2009 | Yang et al. |
| 2013/0059592 A1* | 3/2013 | Chakraborty ..... H04W 56/0015 455/444 |
| 2015/0131645 A1* | 5/2015 | Reunamaki ........... H04W 56/00 370/350 |
| 2015/0319556 A1 | 11/2015 | Chen et al. |
| 2016/0165371 A1 | 6/2016 | Sheen |
| 2019/0037018 A1* | 1/2019 | Scurrell .................. H04L 67/10 |
| 2019/0174466 A1 | 6/2019 | Zhang et al. |
| 2020/0029490 A1 | 1/2020 | Bertucci et al. |
| 2020/0059504 A1* | 2/2020 | Ho .......................... H04L 65/80 |
| 2020/0128482 A1 | 4/2020 | Daoura et al. |
| 2021/0099329 A1* | 4/2021 | Hellfajer ........... H04W 52/0245 |

FOREIGN PATENT DOCUMENTS

| | | |
|---|---|---|
| CN | 105047209 | 11/2015 |
| CN | 105611381 | 5/2016 |
| CN | 106373600 | 2/2017 |
| CN | 107181506 | 9/2017 |
| CN | 107333339 A | 11/2017 |
| CN | 107454510 | 12/2017 |
| CN | 108108146 A | 6/2018 |
| CN | 108111997 | 6/2018 |
| CN | 108200495 | 6/2018 |
| CN | 108337595 | 7/2018 |
| CN | 108415685 | 8/2018 |
| CN | 109565772 A | 4/2019 |
| CN | 110267305 | 9/2019 |
| CN | 110636600 A | 12/2019 |
| CN | 111405336 | 7/2020 |
| CN | 111491283 | 8/2020 |
| CN | 111817811 | 10/2020 |
| CN | 112953600 A | 6/2021 |
| EP | 3644661 | 4/2020 |
| WO | 2020113588 | 6/2020 |

\* cited by examiner

| Acquiring status information of a Bluetooth controller in the first audio playing device and Bluetooth time from the Bluetooth controller in the first audio playing device, and determining native Bluetooth time of the first audio playing device based on the status information and the Bluetooth time acquired from the Bluetooth controller in the first audio playing device and the status information | S101 |

↓

Estimating, based on the native Bluetooth time of the first audio playing device and offset time of the native Bluetooth time of the first audio playing device relative to native Bluetooth time of a second audio playing device, absolute time of the second audio playing device, or estimating, based on the native Bluetooth time of the first audio playing device, and offset time of the native Bluetooth time of the first audio playing device relative to native Bluetooth time of an audio providing device, absolute time of the audio providing device — S102

↓

Playing an audio signal provided by the audio providing device synchronously with the second audio playing device based on the estimated absolute time — S103

FIG. 1A

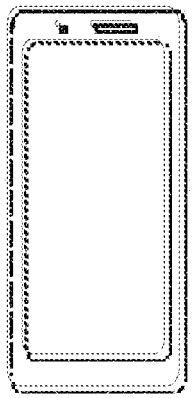

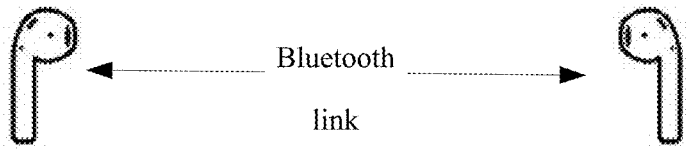

Master Bluetooth earphone     Slave Bluetooth earphone

FIG. 1B

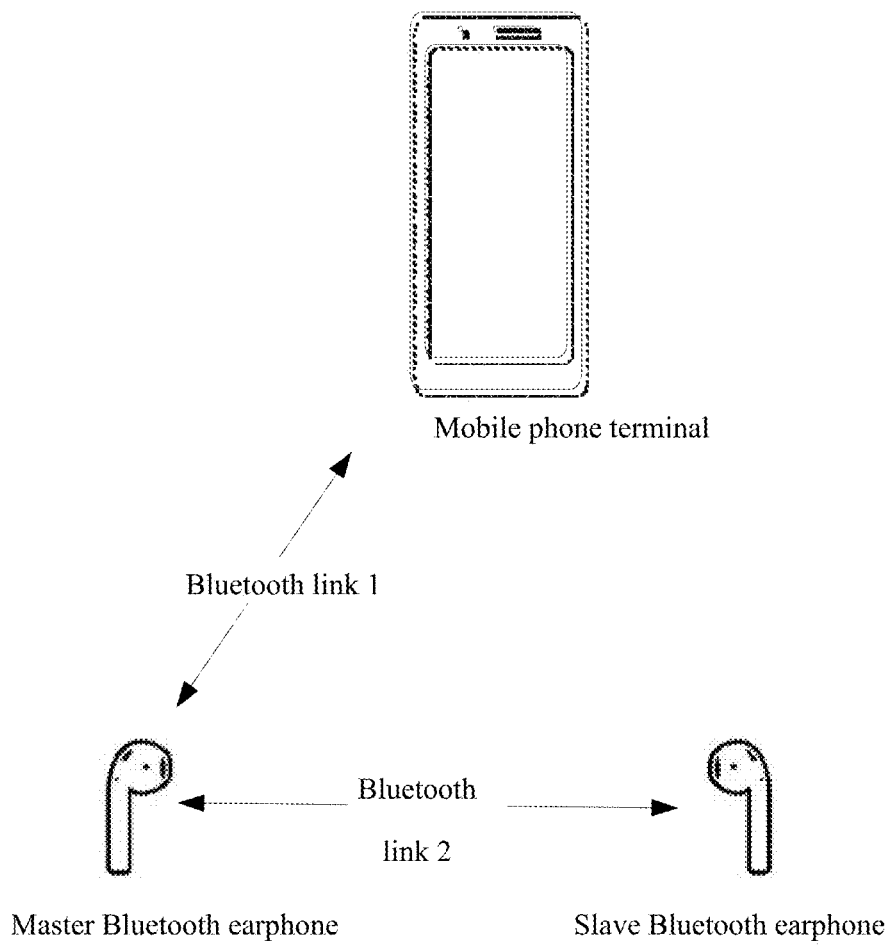

FIG. 1C

| Acquiring status information of a Bluetooth controller in the first audio playing device and Bluetooth time from the Bluetooth controller in the first audio playing device, and determining native Bluetooth time of the first audio playing device based on the status information and the Bluetooth time acquired from the Bluetooth controller in the first audio playing device and the status information | S201 |

↓

| Estimating, based on the native Bluetooth time of the first audio playing device and offset time of the native Bluetooth time of the first audio playing device relative to native Bluetooth time of the audio providing device, the native Bluetooth time of the audio providing device, and determining estimated native Bluetooth time of the audio providing device as the estimated absolute time | S202 |

↓

| Playing an audio signal provided by the audio providing device synchronously with the second audio playing device based on the estimated absolute time | S203 |

FIG. 2A

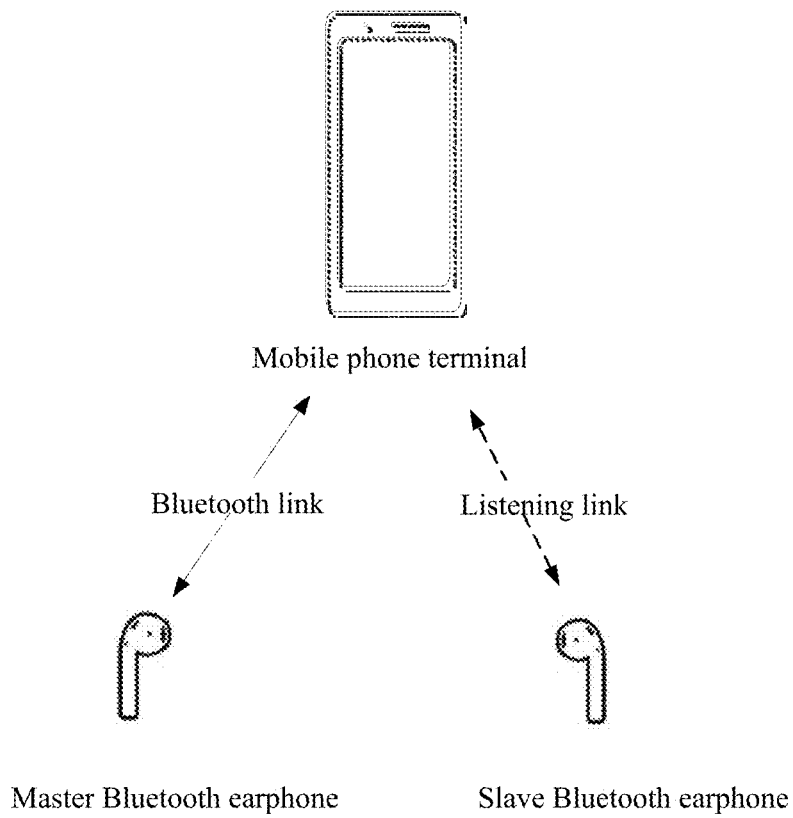

Mobile phone terminal

Bluetooth link    Listening link

Master Bluetooth earphone    Slave Bluetooth earphone

FIG. 2B

| Acquiring status information of a Bluetooth controller in the first audio playing device and Bluetooth time from the Bluetooth controller in the first audio playing device, and determining native Bluetooth time of the first audio playing device based on the status information and the Bluetooth time acquired from the Bluetooth controller in the first audio playing device and the status information | S301 |
|---|---|
| Determining, based on first native Bluetooth time of the first audio playing device, second native Bluetooth time of the first audio playing device, and offset time of the native Bluetooth time of the first audio playing device relative to native Bluetooth time of the audio providing device, elapsed time of the first native Bluetooth time relative to the second native Bluetooth time, and determining the elapsed time as the estimated absolute time | S302 |
| Playing an audio signal provided by the audio providing device synchronously with the second audio playing device based on the estimated absolute time | S303 |

FIG. 3A

METHOD, APPARATUS AND DEVICE FOR SYNCHRONOUSLY PLAYING AUDIO

CROSS-REFERENCE TO RELATED APPLICATIONS

The present disclosure is a continuation of U.S. patent application Ser. No. 17/184,391 filed on Feb. 24, 2021, which is a continuation of International Application No. PCT/CN2020/126675 filed on Nov. 5, 2020, which are all hereby incorporated by reference as if set forth in their entirety for all purposes.

TECHNICAL FIELD

Embodiments of the present disclosure relate to the field of data processing, and specifically to a method, apparatus and electronic device for synchronously playing audio.

BACKGROUND

With the development of multimedia technology, in more and more application scenarios, a plurality of devices is required to form a synchronous playing system for synchronously playing audio, such that the plurality of devices synchronously makes a sound, thereby achieving the functions and effects unachievable by a single device. For example, a True Wireless Stereo (TWS) Bluetooth earphone synchronously plays audio, thereby achieving the surround sound effect of two sound channels. In addition, the True Wireless Stereo Bluetooth earphone can further avoid the entanglement and pulling of earphone cords, and has the echometer effects, thereby effectively improving the user experience of using the earphone. For another example, two Bluetooth speakers synchronously play audio, which can also achieve the surround sound effect of two sound channels.

The TWS Bluetooth earphone includes a master Bluetooth earphone and a slave Bluetooth earphone that are not physically connected, thereby completely eliminating the troubles of earphone cords, and facilitating people's life. The master Bluetooth earphone and the slave Bluetooth earphone run independently of each other and fail to achieve synchronous playing of audio through a wired connection. Therefore, how to achieve synchronous playing of audio by the master Bluetooth earphone and the slave Bluetooth earphone has become a technical problem to be solved urgently. In existing technologies, software compensation is often used to achieve synchronous playing of audio by the master Bluetooth earphone and the slave Bluetooth earphone. However, software compensation lacks hardware support, and the synchronous playing of audio is greatly delayed, thereby failing to effectively improve the precision of synchronous playing of audio. Similar to the TWS Bluetooth earphone, the Bluetooth speaker also has a technical problem of failing to effectively improve the precision of synchronous playing of audio. Thus, it can be seen that how to effectively improve the precision of synchronous playing of audio has become a technical problem to be solved urgently at present.

SUMMARY

In view of this, one of the technical problems to be solved by embodiments of the present disclosure is to provide a method, device, and chip for synchronously playing audio, to at least solve the above technical problems.

According to a first aspect of embodiments of the present disclosure, a method for synchronously playing audio is provided. The method is applied to a first audio playing device, and includes: acquiring status information of a Bluetooth controller in the first audio playing device and Bluetooth time from the Bluetooth controller in the first audio playing device, and determining native Bluetooth time of the first audio playing device based on the Bluetooth time acquired from the Bluetooth controller in the first audio playing device and the status information, wherein the status information is information indicative of a state that the Bluetooth controller in the first audio playing device is in; estimating, based on the native Bluetooth time of the first audio playing device and offset time of the native Bluetooth time of the first audio playing device relative to native Bluetooth time of a second audio playing device, absolute time of the second audio playing device, and playing an audio signal provided by an audio providing device synchronously with the second audio playing device based on the estimated absolute time; or estimating, based on the native Bluetooth time of the first audio playing device, and offset time of the native Bluetooth time of the first audio playing device relative to native Bluetooth time of the audio providing device, absolute time of the audio providing device, and playing an audio signal provided by the audio providing device synchronously with the second audio playing device based on the estimated absolute time. The second audio playing device and the first audio playing device are paired and are Bluetoothed with the audio providing device.

According to a second aspect of the embodiments of the present disclosure, an apparatus for synchronously playing audio is provided. The apparatus includes: a timer communicatively connected to a Bluetooth controller, and a first audio playing module communicatively connected to the timer. The timer is configured to: determine native Bluetooth time of the first audio playing module based on status information of the Bluetooth controller and Bluetooth time acquired from the Bluetooth controller in the first audio playing module, wherein the status information is information indicative of a state that the Bluetooth controller in the first audio playing module is in; and estimate, based on the native Bluetooth time of the first audio playing module and offset time of the native Bluetooth time of the first audio playing module relative to native Bluetooth time of the second audio playing module, absolute time of the second audio playing module; or estimate, based on the native Bluetooth time of the first audio playing module, and offset time of the native Bluetooth time of the first audio playing module relative to native Bluetooth time of an audio providing device, absolute time of the audio providing device. The first audio playing module and the second audio playing module are Bluetoothed with the audio providing device. The first audio playing module is configured to play an audio signal provided by the audio providing device synchronously with the second audio playing module based on the estimated absolute time.

According to a third aspect of the embodiments of the present disclosure, an apparatus for synchronously playing audio is provided. The apparatus includes: a timer communicatively connected to a Bluetooth controller, and a first audio playing module communicatively connected to the timer. The timer is configured to: determine native Bluetooth time of the first audio playing module based on status information of the Bluetooth controller and Bluetooth time acquired from the Bluetooth controller in the first audio playing module, wherein the status information is information indicative of a state that the Bluetooth controller in the first audio playing module is in; estimate, based on the native Bluetooth time of the first audio playing module and offset time of the native Bluetooth time of the first audio playing module relative to native Bluetooth time of a second audio playing module, absolute time of the second audio playing module, and generate the synchronous audio playing signal based on the estimated absolute time; or estimate, based on the native Bluetooth time of the first audio playing module, and offset time of the native Bluetooth time of the first audio playing module relative to native Bluetooth time of an audio providing device, absolute time of the audio providing device; and generate a synchronous audio playing signal based on the estimated absolute time. The first audio playing module and the second audio playing module are Bluetoothed with the audio providing device. The first audio playing module is configured to play an audio signal provided by the audio providing device synchronously with the second audio playing module based on the synchronous audio playing signal.

According to a fourth aspect of the embodiments of the present disclosure, a computer-readable storage medium is provided. The computer-readable storage medium stores a computer program thereon, and the program, when executed by a processor, implements the method for synchronously playing audio according to the first aspect of the embodiments of the present disclosure.

According to a fifth aspect of the embodiments of the present disclosure, an electronic device is provided. The electronic device includes the apparatus for synchronously playing audio according to the second aspect or the third aspect of the embodiments of the present disclosure.

In the embodiments of the present disclosure, based on native Bluetooth time of the first audio playing device, absolute time of a second audio playing device paired with the first audio playing device or an audio providing device is estimated, such that the first audio playing device can obtain the absolute time of the second audio playing device or the audio providing device, and then play an audio signal provided by the audio providing device synchronously with the second audio playing device based on the estimated absolute time. In addition, the native Bluetooth time of the first audio playing device is obtained based on Bluetooth time of a Bluetooth controller in the first audio playing device, and a clock accurate to microsecond is provided inside the Bluetooth controller, thereby effectively improving the precision of synchronous playing of audio by the first audio playing device and the second audio playing device without the need for additionally occupying an antenna to receive and send a synchronous audio playing signal.

BRIEF DESCRIPTION OF THE DRAWINGS

Some specific embodiments of embodiments of the present disclosure will be described in detail below with reference to the accompanying drawings in an example manner, instead of a limiting manner. Identical reference numerals in the accompanying drawings represent identical or similar components or parts. Those skilled in the art should understand that these accompanying drawings may not be drawn to scale. In the figures:

FIG. 1A is a flowchart of a method for synchronously playing audio provided in Embodiment I of the present disclosure;

FIG. 1B is a first schematic diagram of a first audio playing device and a second audio playing device provided in Embodiment I of the present disclosure being in a forwarding mode of classic Bluetooth protocol;

FIG. 1C is a second schematic diagram of the first audio playing device and the second audio playing device provided in Embodiment I of the present disclosure being in the forwarding mode of the classic Bluetooth protocol;

FIG. 2A is a flowchart of a method for synchronously playing audio provided in Embodiment II of the present disclosure;

FIG. 2B is a schematic diagram of a first audio playing device and a second audio playing device provided in Embodiment II of the present disclosure being in a listening mode of the classic Bluetooth protocol;

FIG. 3A is a flowchart of a method for synchronously playing audio provided in Embodiment III of the present disclosure;

DETAILED DESCRIPTION OF EMBODIMENTS

Figure 3B:
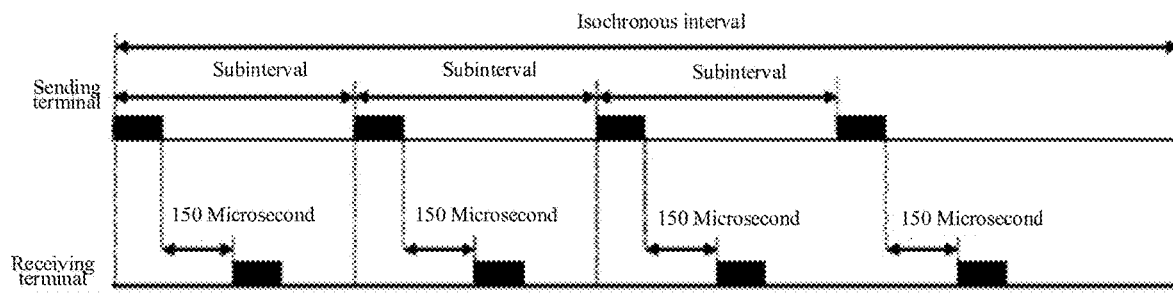
FIG. 3B is a connection sequence diagram of a connected isochronous stream communication link provided in Embodiment III of the present disclosure.

Specific implementations of embodiments of the present disclosure will be further described below with reference to the accompanying drawings of the embodiments of the present disclosure.

Referring to FIG. 1A, a flowchart of a method for synchronously playing audio in Embodiment I of the present disclosure is shown.

The method for synchronously playing audio provided in this embodiment may be applied to a forwarding mode and a listening mode of classic Bluetooth protocol, and a synchronous mode of Bluetooth low energy protocol. In this embodiment, the method for synchronously playing audio provided in this embodiment is described in detail from the perspective of a first audio playing device. Specifically, the method for synchronously playing audio provided in this embodiment includes the following steps:

Step S101: acquiring status information of a Bluetooth controller in the first audio playing device and Bluetooth time from the Bluetooth controller in the first audio playing device, and determining native Bluetooth time of the first audio playing device based on the status information and the Bluetooth time acquired from the Bluetooth controller in the first audio playing device.

In this embodiment, the Bluetooth controller may be understood as a chip that controls Bluetooth communication or data transmission of the first audio playing device. The status information may be understood as information indicative of a state that the Bluetooth controller is in, e.g., information indicating that the Bluetooth controller is in an operating state, or information indicating that the Bluetooth controller is in a dormant state. The native Bluetooth time of the first audio playing device may be understood as a Bluetooth communication duration of the first audio playing device natively timed by the first audio playing device after the first audio playing device is accessed to a Bluetooth link. Specifically, a timer of the first audio playing device acquires the status information of the Bluetooth controller in the first audio playing device and the Bluetooth time of the Bluetooth controller in the first audio playing device from the Bluetooth controller of the first audio playing device, and determines the native Bluetooth time of the first audio playing device based on the status information and the Bluetooth time acquired from the Bluetooth controller in the first audio playing device and the status information;

In some alternative embodiments, when determining the native Bluetooth time of the first audio playing device based on the status information and the Bluetooth time acquired from the Bluetooth controller in the first audio playing device and the status information, if the status information is information indicating that the Bluetooth controller is in the operating state, then Bluetooth time sampled by the timer of the first audio playing device from the Bluetooth controller is determined as the native Bluetooth time of the first audio playing device. The Bluetooth time may be understood as a Bluetooth communication duration of the first audio playing device timed by the Bluetooth controller of the first audio playing device. Thus, when the Bluetooth controller in the first audio playing device is in the operating state, the native Bluetooth time of the first audio playing device can be accurately determined by sampling the Bluetooth time from the Bluetooth controller.

In some alternative embodiments, when determining the native Bluetooth time of the first audio playing device based on the status information and the Bluetooth time acquired from the Bluetooth controller in the first audio playing device and the status information, if the status information is information indicating that the Bluetooth controller is in the dormant state, then the native Bluetooth time of the first audio playing device is determined based on a low-energy duration of the first audio playing device and Bluetooth time sampled last time from the Bluetooth controller. The low-energy duration is a duration during which the Bluetooth controller is in the dormant state. Thus, when the Bluetooth controller in the first audio playing device is in the dormant state, the native Bluetooth time of the first audio playing device can be accurately determined based on the low-energy duration of the first audio playing device and the Bluetooth time sampled last time from the Bluetooth controller.

In a specific example, when determining the native Bluetooth time of the first audio playing device based on the low-energy duration of the first audio playing device and the Bluetooth time sampled last time from the Bluetooth controller, the low-energy duration of the first audio playing device is added to the Bluetooth time sampled last time from the Bluetooth controller to obtain an adding result, and the adding result is determined as the native Bluetooth time of the first audio playing device.

In a specific example, a time division multiplex communication mechanism is used for Bluetooth communication, and a Bluetooth clock accurate to microsecond is provided inside the Bluetooth controller. In addition, the Bluetooth controller may be in the dormant state after completing receiving desired Bluetooth data, and when the Bluetooth controller is in the dormant state, the timer of the first audio playing device fails to sample the Bluetooth time of the Bluetooth controller, a low-energy clock is designed inside the first audio playing device to time a duration during which the Bluetooth controller is in the dormant state. Specifically, when the Bluetooth controller enters the dormant state, the low-energy clock counts from zero (e.g., plus 1 every 0.5 us), then can obtain the low-energy duration of the first audio playing device, and stops sampling the Bluetooth time of the Bluetooth controller. After the Bluetooth controller terminates the dormant state, the low-energy clock stops counting, and the timer of the first audio playing device continues to sample the Bluetooth time of the Bluetooth controller.

Step S102: estimating, based on the native Bluetooth time of the first audio playing device and offset time of the native Bluetooth time of the first audio playing device relative to native Bluetooth time of a second audio playing device, absolute time of the second audio playing device, or estimating, based on the native Bluetooth time of the first audio playing device, and offset time of the native Bluetooth time of the first audio playing device relative to native Bluetooth time of an audio providing device, absolute time of the audio providing device.

In this embodiment, the audio providing device is an audio source provider, and the audio providing device may be any device having a computing power and a processing power. The audio providing device includes a Bluetooth controller that supports Bluetooth protocol. As long as it is compatible with Bluetooth communication with the audio playing device, it may be, but is not limited to, a single-mode Bluetooth controller that supports the classic Bluetooth protocol or the Bluetooth low energy protocol, or a dual-mode Bluetooth controller that also supports the Bluetooth low energy protocol. The audio providing device may also have a voice communication function. For example, the audio providing device may be a mobile phone terminal, a tablet computer, a vehicle device, an industrial device, and the like. The second audio playing device and the first audio playing device are paired and are Bluetoothed with the audio providing device. The second audio playing device being paired with the first audio playing device may be understood as the second audio playing device being paired and matching with the first audio playing device. For example, a user listens to music played in a mobile phone terminal through a TWS Bluetooth earphone, the mobile phone terminal is Bluetoothed with two earphones of the TWS Bluetooth earphone, the first audio playing device may be a master earphone of the TWS Bluetooth earphone, the second audio playing device may be a slave earphone of the TWS Bluetooth earphone, and the audio providing device is the mobile phone terminal. For another example, when the first audio playing device is a slave Bluetooth earphone of the TWS Bluetooth earphone Bluetoothed with the mobile phone terminal, the second audio playing device may be a master Bluetooth earphone of the TWS Bluetooth earphone Bluetoothed with the mobile phone terminal. For still another example, when the first audio playing device is a master Bluetooth speaker Bluetoothed with the mobile phone terminal, the second audio playing device may be a slave Bluetooth speaker Bluetoothed with the mobile phone terminal.

In some alternative embodiments, the first audio playing device and the second audio playing device are in the forwarding mode of the classic Bluetooth protocol. When estimating, based on the native Bluetooth time of the first audio playing device and the offset time of the native Bluetooth time of the first audio playing device relative to the native Bluetooth time of the second audio playing device, the absolute time of the second audio playing device, the native Bluetooth time of the second audio playing device is estimated based on the native Bluetooth time of the first audio playing device, and the offset time of the native Bluetooth time of the first audio playing device relative to the native Bluetooth time of the second audio playing device, and the estimated native Bluetooth time of the second audio playing device is determined as the estimated absolute time. Thus, the estimated native Bluetooth time of the second audio playing device can be determined as the estimated absolute time based on the native Bluetooth time of the first audio playing device and the offset time of the native Bluetooth time of the first audio playing device relative to the native Bluetooth time of the second audio playing device.

In a specific example, since the first audio playing device and the second audio playing device are in the forwarding mode of the classic Bluetooth protocol, the first audio playing device may be the slave Bluetooth earphone or the slave Bluetooth speaker, and the second audio playing device may be the master Bluetooth earphone or the master Bluetooth speaker. Considering that a Bluetooth communication device has a frequency deviation, Bluetooth protocol specifications require a slave device in Bluetooth communication to compute, when receiving desired Bluetooth data, offset time of native Bluetooth time of the slave device relative to native Bluetooth time of a master device, and estimate the native Bluetooth time of the master device based on the computed offset time, to ensure that a difference between Bluetooth time of the master device and Bluetooth time of the slave device is less than or equal to 1 us at a moment of receiving the data. The offset time of the native Bluetooth time of the first audio playing device relative to the native Bluetooth time of the second audio playing device may be acquired from firmware of the Bluetooth controller. The firmware of the Bluetooth controller may be understood as an application program installed in the Bluetooth controller for computing the offset time of the native Bluetooth time of the first audio playing device relative to the native Bluetooth time of the second audio playing device. Specifically, when the Bluetooth controller of the first audio playing device receives the desired Bluetooth data (e.g., an audio signal) from the second audio playing device each time, the firmware of the Bluetooth controller can determine desired arrival time of the desired Bluetooth data arriving at the first audio playing device from the second audio playing device based on the Bluetooth protocol specifications; and compare the desired arrival time and actual arrival time of the desired Bluetooth data arriving at the first audio playing device from the second audio playing device, to obtain the offset time of the native Bluetooth time of the first audio playing device relative to the native Bluetooth time of the second audio playing device. More specifically, the firmware of the Bluetooth controller can precisely compute native Bluetooth time of desired arrival of the desired Bluetooth data based on the Bluetooth protocol specifications, compute a difference between the native Bluetooth time of desired arrival of the desired Bluetooth data and native Bluetooth time of actual arrival of the desired Bluetooth data, and then determine the difference as the offset time of the native Bluetooth time of the first audio playing device relative to the native Bluetooth time of the second audio playing device. Thus, the native Bluetooth time of desired arrival of the desired Bluetooth data is compared with the native Bluetooth time of actual arrival of the desired Bluetooth data, thereby accurately obtaining the offset time of the native Bluetooth time of the first audio playing device relative to the native Bluetooth time of the second audio playing device.

In a specific example, when estimating the native Bluetooth time of the second audio playing device, the native Bluetooth time of the first audio playing device may be added to the offset time of the native Bluetooth time of the first audio playing device relative to the native Bluetooth time of the second audio playing device to obtain the estimated native Bluetooth time of the second audio playing device.

Step S103: playing an audio signal provided by the audio providing device synchronously with the second audio playing device based on the estimated absolute time.

In some alternative embodiments, when playing the audio signal provided by the audio providing device synchronously with the second audio playing device based on the estimated absolute time, a modulo operation is performed on the estimated native Bluetooth time of the second audio playing device, to obtain synchronous playing time of an audio signal of the first audio playing device and the second audio playing device; and the audio signal provided by the audio providing device is played synchronously with the second audio playing device based on the synchronous playing time. Thus, the synchronous playing time of the audio signal of the first audio playing device and the second audio playing device obtained by performing the modulo operation on the estimated native Bluetooth time of the second audio playing device can be conveniently read once by an audio playing module in the first audio playing device.

In a specific example, the first audio playing device can perform the modulo operation on the estimated native Bluetooth time of the second audio playing device with $2^{32}$, and store the obtained synchronous playing time of the audio signal of the first audio playing device and the second audio playing device in a 32-bit register, to facilitate reading the synchronous playing time once by the audio playing module in the first audio playing device. Similarly, the second audio playing device may also perform the modulo operation on the native Bluetooth time of the second audio playing device with $2^{32}$, and store the synchronous playing time of the audio signal of the first audio playing device and the second audio playing device obtained by itself in a 32-bit register, to facilitate reading the synchronous playing time once by the audio playing module in the second audio playing device. Based on the Bluetooth protocol specifications, an error between native Bluetooth time of the second audio playing device estimated by the first audio playing device and actual native Bluetooth time of the second audio playing device is less than or equal to 1 us, i.e., an error between synchronous audio playing time determined by the first audio playing device and synchronous audio playing time determined by the second audio playing device is less than or equal to 1 us. That is, the synchronous playing time determined by the first audio playing device is very close to the synchronous playing time determined by the second audio playing device, and the error is on the order of microsecond, thereby effectively improving the precision of synchronous playing of audio by the first audio playing device and the second audio playing device.

In some alternative embodiments, when playing the audio signal provided by the audio providing device synchronously with the second audio playing device based on the synchronous playing time, the first audio playing device sends an audio synchronous playing request to the second audio playing device based on the synchronous playing time, the audio synchronous playing request being used for causing the second audio playing device to determine playing start time and a playing period of the audio signal, and to generate a synchronous audio playing response to be sent to the first audio playing device based on the playing start time and the playing period of the audio signal. Then, the first audio playing device receives the playing start time and the playing period of the audio signal carried in the synchronous audio playing response from the second audio playing device, and generates a periodic level signal or a periodic pulse signal for synchronous playing of the audio signal. Finally, the first audio playing device plays the audio signal provided by the audio providing device synchronously with the second audio playing device based on the periodic level signal or the periodic pulse signal. Thus, the synchronous playing of audio by the first audio playing device and the second audio playing device can be effectively realized based on the periodic level signal or the periodic pulse signal generated based on the playing start time and the playing period of the audio signal.

In a specific example, when the second audio playing device determines the playing start time and the playing period of the audio signal based on the audio synchronous playing request, the second audio playing device acquires the native Bluetooth time of the second audio playing device based on the audio synchronous playing request; determines native synchronous playing time of the audio signal of the first audio playing device and the second audio playing device based on the native Bluetooth time of the second audio playing device; and determines the playing start time and the playing period of the audio signal based on the native synchronous playing time.

In a specific example, as shown in FIG. 1B, the first audio playing device is the slave Bluetooth earphone, and the second audio playing device is the master Bluetooth earphone. Specifically, when the status information of the Bluetooth controller is information indicating that the Bluetooth controller is in the operating state, an apparatus for synchronously playing audio of the slave Bluetooth earphone determines Bluetooth time currently sampled from the Bluetooth controller as native Bluetooth time of the slave Bluetooth earphone. When the status information of the Bluetooth controller is information indicating that the Bluetooth controller is in the dormant state, the apparatus for synchronously playing audio of the slave Bluetooth earphone determines a result of adding the low-energy duration collected by the low-energy clock to the Bluetooth time sampled last time from the Bluetooth controller as the native Bluetooth time of the slave Bluetooth earphone. After obtaining the native Bluetooth time of the slave Bluetooth earphone, the apparatus for synchronously playing audio of the slave Bluetooth earphone adds offset time of the native Bluetooth time of the slave Bluetooth earphone acquired from the firmware of the Bluetooth controller relative to native Bluetooth time of the master Bluetooth earphone to the native Bluetooth time of the slave Bluetooth earphone, to obtain the estimated native Bluetooth time of the master Bluetooth earphone. After obtaining the estimated native Bluetooth time of the master Bluetooth earphone, the apparatus for synchronously playing audio of the slave Bluetooth earphone plays an audio signal provided by the mobile phone terminal synchronously with the master Bluetooth earphone based on the estimated native Bluetooth time of the master Bluetooth earphone.

In a specific example, as shown in FIG. 1C, the first audio playing device is a slave Bluetooth earphone, the second audio playing device is a master Bluetooth earphone, and the audio providing device is a mobile phone terminal. The master Bluetooth earphone is connected with the mobile phone terminal through a Bluetooth link 1, and the master Bluetooth earphone is connected with the slave Bluetooth earphone through a Bluetooth link 2. The master Bluetooth earphone is responsible for forwarding the audio signal sent from the mobile phone terminal to the slave Bluetooth earphone, i.e., the master Bluetooth earphone and the slave Bluetooth earphone are in the forwarding mode of the classic Bluetooth protocol. The process of synchronously playing audio by the master Bluetooth earphone and the slave Bluetooth earphone is similar to the process of synchronously playing audio by the master Bluetooth earphone and the slave Bluetooth earphone described with reference to FIG. 1B in this embodiment. The description will not be repeated here. Based on the Bluetooth protocol specifications, an error between native Bluetooth time of the master Bluetooth earphone estimated by the slave Bluetooth earphone and actual native Bluetooth time of the master Bluetooth earphone is less than or equal to 1 us, i.e., an error between synchronous audio playing time determined by the slave Bluetooth earphone and synchronous audio playing time determined by the master Bluetooth earphone is less than or equal to 1 us. If the mobile phone terminal sends a frame of audio signals every 10 ms and a clock precision of the slave Bluetooth earphone is 20 ppm (parts per million), then a deviation between synchronous playing time of the master Bluetooth earphone and synchronous playing time of the slave Bluetooth earphone is less than or equal to 10 ms*20 ppm=0.2 us. Therefore, in the forwarding mode of the classic Bluetooth protocol, a deviation of synchronous playing of audio of the method for synchronously playing audio provided in this embodiment is on the order of microsecond.

In this embodiment, based on native Bluetooth time of the first audio playing device and offset time of the native Bluetooth time of the first audio playing device relative to native Bluetooth time of the second audio playing device, the native Bluetooth time of the second audio playing device is estimated, such that the first audio providing device can obtain absolute time of the second audio playing device, and then play an audio signal provided by the audio providing device synchronously with the second audio playing device based on the estimated native Bluetooth time of the second audio playing device. In addition, the native Bluetooth time of the first audio playing device and the offset time of the native Bluetooth time of the first audio playing device relative to the native Bluetooth time of the second audio playing device are each obtained based on Bluetooth time of a Bluetooth controller in the first audio playing device, and a clock accurate to microsecond is provided inside the Bluetooth controller, thereby effectively improving the precision of synchronous playing of audio by the first audio playing device and the second audio playing device without the need for additionally occupying an antenna to receive and send a synchronous audio playing signal.

Referring to FIG. 2A, a flowchart of a method for synchronously playing audio in Embodiment II of the present disclosure is shown.

The method for synchronously playing audio provided in this embodiment may be applied to a listening mode of classic Bluetooth protocol. Before describing in detail the method for synchronously playing audio provided in this embodiment, the listening mode of the classic Bluetooth protocol will be first described in detail. Assuming that a communication system includes an audio providing device, a first audio playing device Bluetoothed with the audio providing device, and a second audio playing device communicatively connected to the first audio playing device, the first audio playing device can transmit related communication parameters to the second audio playing device, e.g., underlying Bluetooth protocol parameters, such as Bluetooth time, Bluetooth address, 3BIT logical address, hopping sequence, connection key, and encoding key, and upper layer Bluetooth protocol parameters, such as L2CAP, RFCOMM, Handfree, and A2DP. The second audio playing device enters a Bluetooth network between the audio providing device and the first audio playing device in a listening mode based on these related communication parameters, and then completes networking. If the audio providing device sends an audio signal to the first audio playing device, the second audio playing device can also receive the audio signal sent to the first audio playing device from the audio providing device by listening to a Bluetooth connection between the audio providing device and the first audio playing device.

In this embodiment, the method for synchronously playing audio provided in this embodiment is described in detail from the perspective of the first audio playing device. Specifically, the method for synchronously playing audio provided in this embodiment includes the following steps:

Step S201: acquiring status information of a Bluetooth controller in the first audio playing device and Bluetooth time from the Bluetooth controller in the first audio playing device, and determining native Bluetooth time of the first audio playing device based on the status information the Bluetooth time acquired from the Bluetooth controller in the first audio playing device and the status information.

Since a specific implementation of step S201 is similar to the specific implementation of step S101 in the above Embodiment I, the description will not be repeated here.

Step S202: estimating, based on the native Bluetooth time of the first audio playing device and offset time of the native Bluetooth time of the first audio playing device relative to native Bluetooth time of the audio providing device, the native Bluetooth time of the audio providing device, and determining estimated native Bluetooth time of the audio providing device as the estimated absolute time.

In this embodiment, the second audio playing device and the first audio playing device are paired and are Bluetoothed with the audio providing device. Step S102 in the above Embodiment I is referred to for example description on the second audio playing device and the first audio playing device being paired and being Bluetoothed with the audio providing device. The description will not be repeated here.

In a specific example, since the first audio playing device and the second audio playing device are in the listening mode of the classic Bluetooth protocol, the first audio playing device includes a master Bluetooth earphone or a slave Bluetooth earphone, and the second audio playing device includes a master Bluetooth earphone or a slave Bluetooth earphone. The offset time of the native Bluetooth time of the first audio playing device relative to the native Bluetooth time of the audio providing device may be acquired from firmware of the Bluetooth controller.

In a specific example, when estimating the native Bluetooth time of the audio providing device, the native Bluetooth time of the first audio playing device may be added to the offset time of the native Bluetooth time of the first audio playing device relative to the native Bluetooth time of the audio providing device to obtain the estimated native Bluetooth time of the audio providing device.

Step S203: playing an audio signal provided by the audio providing device synchronously with the second audio playing device based on the estimated absolute time.

In some alternative embodiments, when playing the audio signal provided by the audio providing device synchronously with the second audio playing device based on the estimated absolute time, a modulo operation is performed on the estimated native Bluetooth time of the audio providing device, to obtain synchronous playing time of an audio signal of the first audio playing device and the second audio playing device; and the audio signal provided by the audio providing device is played synchronously with the second audio playing device based on the synchronous playing time. Thus, the synchronous playing time of the audio signal of the first audio playing device and the second audio playing device obtained by performing the modulo operation on the estimated native Bluetooth time of the audio providing device can be conveniently read once by an audio playing module in the first audio playing device.

In some alternative embodiments, when playing the audio signal provided by the audio providing device synchronously with the second audio playing device based on the synchronous playing time, an audio synchronous playing request is sent to the second audio playing device based on the synchronous playing time, the audio synchronous playing request is used for causing the second audio playing device to determine playing start time and a playing period of the audio signal, and generate a synchronous audio playing response to be sent to the first audio playing device based on the playing start time and the playing period of the audio signal; receive the playing start time and the playing period of an audio signal carried in the synchronous audio playing response from the second audio playing device, and generate a periodic level signal or a periodic pulse signal for synchronous playing of the audio signal of the first audio playing device and the second audio playing device; and play the audio signal provided by the audio providing device synchronously with the second audio playing device based on the periodic level signal or the periodic pulse signal. Thus, the synchronous playing of audio by the first audio playing device and the second audio playing device can be effectively realized based on the periodic level signal or the periodic pulse signal generated based on the playing start time and the playing period of the audio signal.

In a specific example, when the second audio playing device determines the playing start time and the playing period of the audio signal based on the audio synchronous playing request, the second audio playing device acquires the estimated native Bluetooth time of the audio providing device based on the audio synchronous playing request; determines native synchronous playing time of the audio signal of the first audio playing device and the second audio playing device based on the estimated native Bluetooth time of the audio providing device; and determines the playing start time and the playing period of the audio signal based on the native synchronous playing time. Since a specific implementation of the second audio playing device determining the native synchronous playing time is similar to the specific implementation of the first audio playing device determining the native synchronous playing time, and a specific implementation of the second audio playing device estimating the native Bluetooth time of the audio providing device is also similar to the specific implementation of the first audio playing device estimating the native Bluetooth time of the audio providing device, the synchronous playing time determined by the second audio playing device is very close to the above determined synchronous playing time, and the error is on the order of microsecond, thereby effectively improving the precision of synchronous playing of audio by the first audio playing device and the second audio playing device.

In a specific example, as shown in FIG. 2B, the first audio playing device is a slave Bluetooth earphone, the second audio playing device is a master Bluetooth earphone, and the audio providing device is a mobile phone terminal. The master Bluetooth earphone is Bluetoothed with the mobile phone terminal, and the master Bluetooth earphone is communicatively connected with the slave Bluetooth earphone. A process of synchronously playing audio by the master Bluetooth earphone and the slave Bluetooth earphone is as follows: when the status information of the Bluetooth controller is information indicating that the Bluetooth controller is in an operating state, an apparatus for synchronously playing audio of the slave Bluetooth earphone determines Bluetooth time sampled from the Bluetooth controller as native Bluetooth time of the slave Bluetooth earphone. When the status information of the Bluetooth controller is information indicating that the Bluetooth controller is in a dormant state, the apparatus for synchronously playing audio of the slave Bluetooth earphone determines a result of adding a low-energy duration sampled from the low-energy clock to Bluetooth time sampled last time from the Bluetooth controller as the native Bluetooth time of the slave Bluetooth earphone. After obtaining the native Bluetooth time of the slave Bluetooth earphone, the apparatus for synchronously playing audio of the slave Bluetooth earphone adds offset time of the native Bluetooth time of the slave Bluetooth earphone acquired from the firmware of the Bluetooth controller relative to native Bluetooth time of the mobile phone terminal to the native Bluetooth time of the slave Bluetooth earphone, to obtain estimated native Bluetooth time of the mobile phone terminal. After obtaining the estimated native Bluetooth time of the mobile phone terminal, the apparatus for synchronously playing audio of the slave Bluetooth earphone performs a modulo operation on the estimated native Bluetooth time of the mobile phone terminal to obtain the synchronous playing time of the audio signal. Similarly, the master Bluetooth earphone obtains the synchronous playing time of the audio signal in the same manner as the slave Bluetooth earphone does. Then, the slave Bluetooth earphone generates the periodic level signal or the periodic pulse signal for synchronous playing of the audio signal based on the synchronous playing time, and finally plays the audio signal provided by the mobile phone terminal synchronously with the master Bluetooth earphone based on the periodic level signal or the periodic pulse signal.

Based on Bluetooth protocol specifications, an error between native Bluetooth time of the mobile phone terminal estimated by the slave Bluetooth earphone and actual native Bluetooth time of the mobile phone terminal is less than or equal to 1 us, and an error between native Bluetooth time of the mobile phone terminal estimated by the master Bluetooth earphone and the actual native Bluetooth time of the mobile phone terminal is also less than or equal to 1 us. Therefore, an error between the native Bluetooth time of the mobile phone terminal estimated by the master Bluetooth earphone and the native Bluetooth time of the mobile phone terminal estimated by the slave Bluetooth earphone is less than or equal to 2 us. That is, an error between synchronous playing time determined by the slave Bluetooth earphone and synchronous playing time determined by the master Bluetooth earphone is less than or equal to 2 us. If the mobile phone terminal sends a frame of audio signals every 10 ms, and time precision of the master Bluetooth earphone and time precision of the slave Bluetooth earphone are each 20 ppm (parts per million), then a deviation between time of the master Bluetooth earphone or the slave Bluetooth earphone and time of the mobile phone terminal is less than or equal to 10 ms*20 ppm=0.2 us, i.e., a deviation between synchronous playing time of the master Bluetooth earphone and synchronous playing time of the slave Bluetooth earphone is less than or equal to 2.4 us. Therefore, in the listening mode of the classic Bluetooth protocol, a deviation of synchronous audio playing of the method for synchronously playing audio provided in this embodiment is on the order of microsecond.

In this embodiment, based on native Bluetooth time of the first audio playing device and offset time of the native Bluetooth time of the first audio playing device relative to native Bluetooth time of the audio providing device, the native Bluetooth time of the audio providing device is estimated, such that the first audio playing device can obtain absolute time of the audio providing device, and then play an audio signal provided by the audio providing device synchronously with the second audio playing device based on the estimated native Bluetooth time of the audio providing device. In addition, the native Bluetooth time of the first audio playing device and the offset time of the native Bluetooth time of the first audio playing device relative to the native Bluetooth time of the audio providing device are each obtained based on Bluetooth time of a Bluetooth controller in the first audio playing device, and a clock accurate to microsecond is provided inside the Bluetooth controller, thereby effectively improving the precision of synchronous playing of audio by the first audio playing device and the second audio playing device without the need for additionally occupying an antenna to receive and send a synchronous audio playing signal.

Referring to FIG. 3A, a flowchart of a method for synchronously playing audio in Embodiment III of the present disclosure is shown.

Figure 3C:
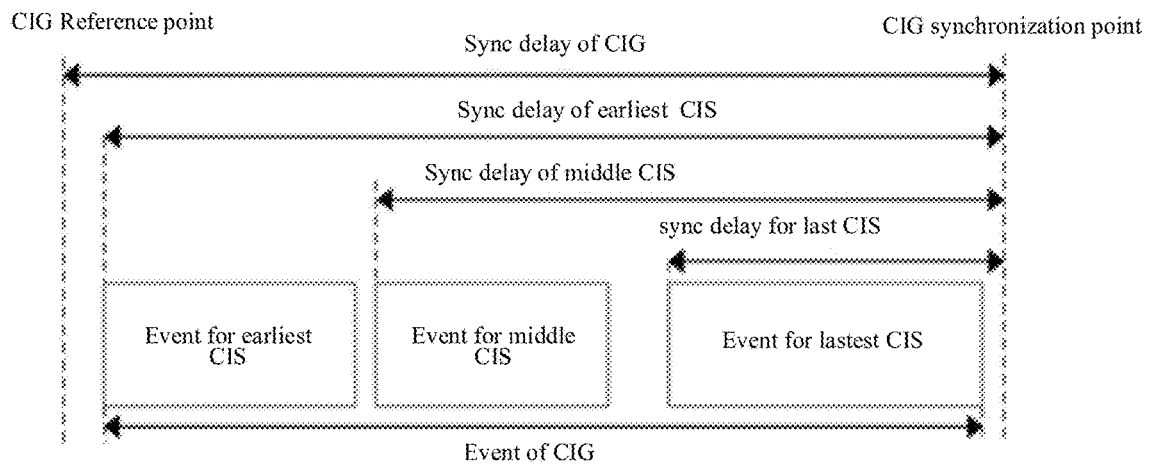
FIG. 3C is a schematic diagram of synchronization point alignment of the connected isochronous stream communication link provided in Embodiment III of the present disclosure.
Figure 3D:
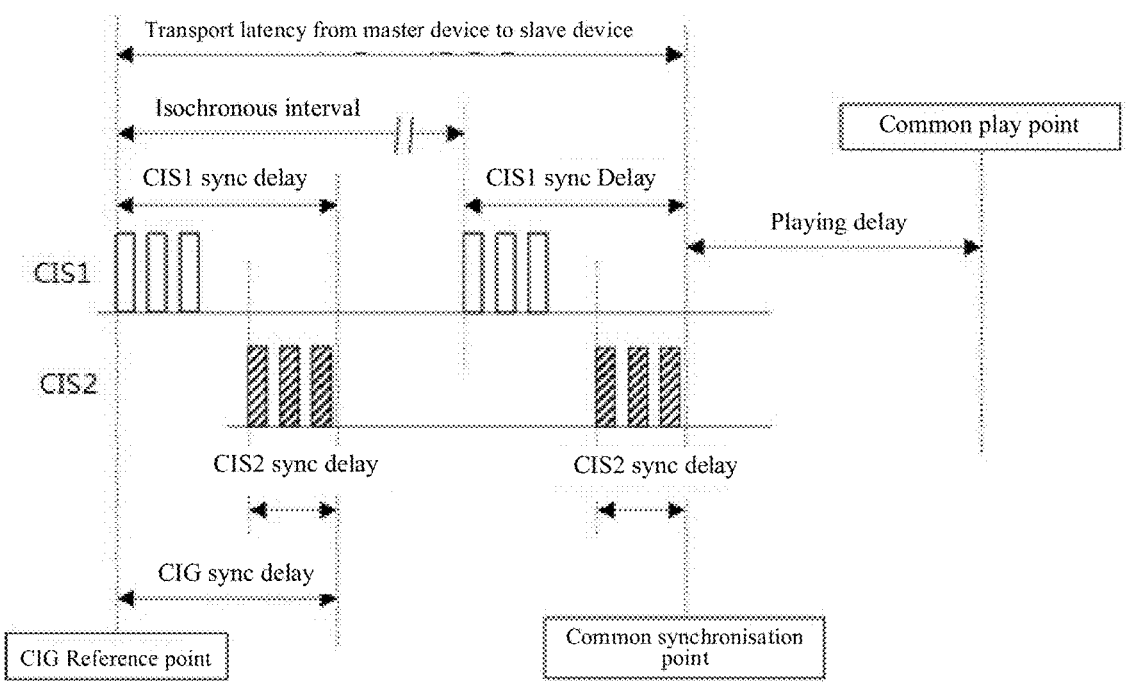
FIG. 3D is a schematic diagram of a connected isochronous stream communication link of an audio playing device provided in Embodiment III of the present disclosure.

The method for synchronously playing audio provided in this embodiment may be applied to a synchronous mode of Bluetooth low energy protocol. Before describing in detail the method for synchronously playing audio provided in this embodiment, the synchronous mode of the Bluetooth low energy protocol is first described in detail. A connected isochronous stream (CIS) in the synchronous mode of the Bluetooth low energy protocol is latest connection-oriented multi-channel isochronous data transmission and reception protocol of the Bluetooth low energy protocol adapted for a TWS Bluetooth earphone, and, as shown in FIG. 3B, mainly has features as follows: in an isochronous interval (e.g., 10 ms), a master device (e.g., a mobile phone terminal) and a slave device (e.g., a master Bluetooth earphone of the TWS Bluetooth earphone) will complete current data interaction, and the data interaction has timeliness. Specifically, if the master device does not receive an acknowledgment message from the slave device 150 us later, the master device will consider that the slave device has not received data, and will automatically resend the data. If the slave device still does not receive the data within specified time, timeout will be caused, and the master device will not resend timeout data. Parameters, such as the isochronous interval and timeout information, are issued by the master device to the slave device. In addition, as shown in FIG. 3C, desired Bluetooth data transmitted by a plurality of connected isochronous stream communication links is alignable, and an alignment point is a synchronization point (which is generally end time of a last connected isochronous stream communication link), i.e., a Bluetooth controller in the slave device in the plurality of connected isochronous stream communication links uploads the received desired Bluetooth data (e.g., an audio signal) to an upper layer (e.g., an audio playing module) of the slave device at the alignment point (at a same moment). Time waiting for uploading the desired Bluetooth data received by Bluetooth controllers in different slave devices is controlled based on a sync delay parameter of respective connected isochronous stream communication links, and the sync delay parameter is issued by the master device to the slave devices. The plurality of connected isochronous stream communication links forms a connected isochronous group (CIG). In a specific application scenario, as shown in FIG. 3D, a mobile phone terminal establishes a connected isochronous stream communication link with a master Bluetooth earphone of a TWS Bluetooth earphone and establishes a connected isochronous stream communication link with a slave Bluetooth earphone of the TWS Bluetooth earphone, where the connected isochronous stream communication link established between the mobile phone terminal and the master Bluetooth earphone is a connected isochronous stream 1, and the connected isochronous stream communication link established between the mobile phone terminal and the slave Bluetooth earphone is a connected isochronous stream 2. At the same time, the mobile phone terminal distributes a time parameter, e.g., an isochronous interval, a data transport latency, or a sync delay (a time difference between relative synchronization points of the connected isochronous stream 1 and the connected isochronous stream 2), of the connected isochronous stream 1 to the master Bluetooth earphone, and of the connected isochronous stream 2 to the slave Bluetooth earphone. After receiving the audio signal, the master Bluetooth earphone sends the received audio signal to an audio playing module of the master Bluetooth earphone based on its time parameter, and synchronously, the slave Bluetooth earphone sends the received audio signal to an audio playing module of the slave Bluetooth earphone based on its time parameter. Then, the audio playing module of the master Bluetooth earphone and the audio playing module of the slave Bluetooth earphone decode and play the received audio signal respectively.

In this embodiment, the method for synchronously playing audio provided in this embodiment is described in detail from the perspective of the first audio playing device. Specifically, the method for synchronously playing audio provided in this embodiment includes the following steps:

Step S301: acquiring status information of a Bluetooth controller in the first audio playing device and Bluetooth time from the Bluetooth controller in the first audio playing device, and determining native Bluetooth time of the first audio playing device based on the status information and the Bluetooth time from the Bluetooth controller in the first audio playing device.

In some alternative embodiments, the first audio playing device is Bluetoothed with the audio providing device via a first connected isochronous stream communication link, and the second audio playing device is Bluetoothed with the audio providing device via a second connected isochronous stream communication link. When determining the native Bluetooth time of the first audio playing device based on the status information and the Bluetooth time from the Bluetooth controller in the first audio playing device, when the first connected isochronous stream communication link is at an n-th synchronization point, the native Bluetooth time of the first audio playing device is determined based on the status information of the Bluetooth controller in the first audio playing device and the Bluetooth time from the Bluetooth controller in the first audio playing device, where n is an integer more than or equal to 2. Thus, the native Bluetooth time of the first audio playing device can be accurately determined based on the status information of the Bluetooth controller in the first audio playing device and the Bluetooth time from the Bluetooth controller in the first audio playing device, when the first connected isochronous stream communication link is at the n-th synchronization point.

In a specific example, the first audio playing device may be a master Bluetooth speaker, a slave Bluetooth speaker, a master Bluetooth earphone or a slave Bluetooth earphone of a TWS Bluetooth earphone, or the like. The second audio playing device may be a master Bluetooth speaker, a slave Bluetooth speaker, a master Bluetooth earphone or a slave Bluetooth earphone of a TWS Bluetooth earphone, or the like. The synchronization point may be understood as a time point at which the Bluetooth controller in the first audio playing device accessed to the first connected isochronous stream communication link uploads the received audio signal to an audio playing module of the first audio playing device synchronously. The Bluetooth controller may be understood as a chip that controls Bluetooth communication or data transmission of the first audio playing device. The status information may be understood as information indicative of a state that the Bluetooth controller is in, e.g., information indicating that the Bluetooth controller is in an operating state, or information indicating that the Bluetooth controller is in a dormant state. Since a specific implementation of the determining the native Bluetooth time of the first audio playing device based on the status information and Bluetooth time acquired from the Bluetooth controller in the first audio playing device is similar to the specific implementation of step S101 in the above Embodiment I, the description will not be repeated here.

Step S302: Determining, based on first native Bluetooth time of the first audio playing device, second native Bluetooth time of the first audio playing device, and offset time of the native Bluetooth time of the first audio playing device relative to native Bluetooth time of the audio providing device, elapsed time of the first native Bluetooth time relative to the second native Bluetooth time, and determining the elapsed time as the estimated absolute time.

In this embodiment, the first native Bluetooth time is native Bluetooth time of the first audio playing device when the first connected isochronous stream communication link is at the n-th synchronization point, and the second native Bluetooth time is native Bluetooth time of the first audio playing device when the first connected isochronous stream communication link is at a first synchronization point. The second audio playing device and the first audio playing device are paired and are Bluetoothed with the audio providing device. Step S102 in the above Embodiment I is referred to for example description on the second audio playing device and the first audio playing device being paired and being Bluetoothed with the audio providing device. The description will not be repeated here.

In a specific example, the master device (e.g., the audio providing device) does not send the native Bluetooth time of the master device (e.g., the audio providing device) to the slave device (e.g., the first audio playing device) based on Bluetooth low energy protocol specifications, such that the first audio playing device cannot determine the absolute time of the audio providing device by estimating the native Bluetooth time of the audio providing device. Therefore, absolute time of the second audio playing device may be determined using isochronous characteristics of the first connected isochronous stream communication link and the second connected isochronous stream communication link, with the native Bluetooth time of the first audio playing device when the first connected isochronous stream communication link is at the first synchronization point as reference time, and with native Bluetooth time of the second audio playing device when the second connected isochronous stream communication link is at a first synchronization point as reference time. In addition, considering that a Bluetooth communication device has a frequency deviation, the Bluetooth low energy protocol specifications require a slave device in Bluetooth communication to compute, when receiving the desired Bluetooth data, offset time of native Bluetooth time of the slave device relative to native Bluetooth time of a master device, and calibrate the computed offset time, to ensure that a time difference between the master device and the slave device is less than or equal to 1 us at a synchronization point. Specifically, when receiving the desired Bluetooth data from the audio providing device each time, the Bluetooth controller of the first audio playing device can precisely compute desired arrival time of the desired Bluetooth data based on parameters, such as the isochronous interval, and an event count parameter, compute a difference between the desired arrival time of the desired Bluetooth data and actual arrival time of the desired Bluetooth data, and then determine the difference as the offset time of the native Bluetooth time of the first audio playing relative to the native Bluetooth time of the audio providing device.

In a specific example, when determining the elapsed time of the first native Bluetooth time of the first audio playing device relative to the second native Bluetooth time of the first audio playing device, the second native Bluetooth time is subtracted from the first native Bluetooth time to obtain a time subtracting result, and the time subtracting result is added to the offset time of the native Bluetooth time of the first audio playing device relative to the native Bluetooth time of the audio providing device, to obtain the elapsed time of the first native Bluetooth time of the first audio playing device relative to the second native Bluetooth time of the first audio playing device.

Step S303: playing an audio signal provided by the audio providing device synchronously with the second audio playing device based on the estimated absolute time.

In some alternative embodiments, when playing the audio signal provided by the audio providing device synchronously with the second audio playing device based on the estimated absolute time, if a synchronization point of the second connected isochronous stream communication link is aligned with the n-th synchronization point of the first connected isochronous stream communication link, the synchronous playing time of the audio signal of the first audio playing device and the second audio playing device is determined based on the elapsed time, and the audio signal provided by the audio providing device is played synchronously with the second audio playing device based on the synchronous playing time. Thus, the synchronous playing time of the audio signal of the first audio playing device and the second audio playing device can be accurately determined based on the elapsed time.

In some alternative embodiments, when determining the synchronous playing time of the audio signal of the first audio playing device and the second audio playing device based on the elapsed time, the synchronous playing time of the audio signal of the first audio playing device and the second audio playing device is determined based on the elapsed time and a preconfigured maximum audio decoding duration. The preconfigured maximum audio decoding duration may be 5 ms. Thus, the synchronous playing time of the audio signal of the first audio playing device and the second audio playing device can be accurately determined based on the elapsed time and the preconfigured maximum audio decoding duration.

In a specific example, the audio providing device is a mobile phone terminal, the first audio playing device is a master Bluetooth earphone of a TWS Bluetooth earphone, the second audio playing device is a slave Bluetooth earphone of the TWS Bluetooth earphone, the master Bluetooth earphone is Bluetoothed with the mobile phone terminal via the first connected isochronous stream communication link, and the slave Bluetooth earphone is Bluetoothed with the mobile phone terminal via the second connected isochronous stream communication link. If the first connected isochronous stream communication link is currently at the n-th synchronization point, and an m-th (m is an integer more than or equal to 1) synchronization point where the second connected isochronous stream communication link is currently located is aligned with the n-th synchronization point where the first connected isochronous stream communication link is currently located, then the master Bluetooth earphone can add elapsed time of native Bluetooth time of the first connected isochronous stream communication link currently at the n-th synchronization point relative to native Bluetooth time of the first connected isochronous stream communication link at the first synchronization point to the preconfigured maximum audio decoding duration, to obtain synchronous playing time of an audio signal of the master Bluetooth earphone and the slave Bluetooth earphone natively at the master Bluetooth earphone. Similarly, the slave Bluetooth earphone can add elapsed time of native Bluetooth time of the second connected isochronous stream communication link currently at the m-th synchronization point relative to native Bluetooth time of the second connected isochronous stream communication link at the first synchronization point to the preconfigured maximum audio decoding time, to obtain synchronous playing time of the audio signal of the master Bluetooth earphone and the slave Bluetooth earphone natively at the slave Bluetooth earphone. Since the m-th synchronization point where the second connected isochronous stream communication link is currently located is aligned with the n-th synchronization point where the first connected isochronous stream communication link is currently located, time when the slave Bluetooth earphone uploads the received audio signal to the audio playing module of the slave Bluetooth earphone is the same as time when the master Bluetooth earphone uploads the received audio signal to the audio playing module of the master Bluetooth earphone. Therefore, it is only necessary to consider a decoding duration of the audio playing module of the slave Bluetooth earphone on the audio signal, and a decoding duration of the audio playing module of the master Bluetooth earphone on the audio signal. The audio signal received by the master Bluetooth earphone is different from the audio signal received by the slave Bluetooth earphone, and the decoding duration of the audio playing module of the slave Bluetooth earphone on the audio signal is different from the decoding duration of the audio playing module of the master Bluetooth earphone on the audio signal. Therefore, the maximum audio decoding duration may be preconfigured to obtain the synchronous playing time of the audio signal of the master Bluetooth earphone and the slave Bluetooth earphone natively at the master Bluetooth earphone and the synchronous playing time of the audio signal of the master Bluetooth earphone and the slave Bluetooth earphone natively at the slave Bluetooth earphone, thereby achieving synchronous playing of the audio signal of the master Bluetooth earphone and the slave Bluetooth earphone. The duration may be a maximum decoding duration of an audio signal frame, e.g., 5 ms.

In some alternative embodiments, when determining the synchronous playing time of the audio signal of the first audio playing device and the second audio playing device based on the elapsed time, the synchronous playing time of the audio signal of the first audio playing device and the second audio playing device is determined based on the elapsed time and a second event count parameter received from the second audio playing device, where the second event count parameter is used for counting the number of isochronous intervals when the second audio playing device is linked with the second connected isochronous stream communication link. Thus, the synchronous playing time of the audio signal of the first audio playing device and the second audio playing device can be accurately determined based on the elapsed time and the second event count parameter received from the second audio playing device.

In a specific example, based on the Bluetooth low energy protocol specifications, when the second audio playing device establishes the second connected isochronous stream communication link with the audio providing device, the second event count parameter of the second audio playing device is zero, and the second event count parameter is increased by one for every additional isochronous interval, That is, the second event count parameter is used for counting the number of isochronous intervals when the second audio playing device is linked with the second connected isochronous stream communication link. The second audio playing device may send the second event count parameter to the first audio playing device by broadcasting or establishing a communication connection.

In some alternative embodiments, when determining the synchronous playing time of the audio signal of the first audio playing device and the second audio playing device based on the elapsed time and the second event count parameter received from the second audio playing device, the synchronous playing time of the audio signal of the first audio playing device and the second audio playing device is determined based on the elapsed time, a first event count parameter of the first audio playing device, the second event count parameter of the second audio playing device, and the isochronous intervals when the first audio playing device is linked with the first connected isochronous stream communication link, where the first event count parameter of the first audio playing device is used for counting the number of isochronous intervals when the first audio playing device is linked with the first connected isochronous stream communication link. Thus, the synchronous playing time of the audio signal of the first audio playing device and the second audio playing device can be accurately determined based on the elapsed time, the first event count parameter of the first audio playing device, the second event count parameter of the second audio playing device, and the isochronous intervals of the first connected isochronous stream communication link to which the first audio playing device is accessed.

In a specific example, when determining the synchronous playing time of the audio signal of the first audio playing device and the second audio playing device based on the elapsed time, the first event count parameter of the first audio playing device, the second event count parameter of the second audio playing device, and the isochronous intervals of the first connected isochronous stream communication link to which the first audio playing device is accessed, the first event count parameter of the first audio playing device is subtracted from the second event count parameter of the second audio playing device, to obtain a subtracting result; the subtracting result is multiplied by the isochronous interval to obtain a multiplying result; and the multiplying result is added to the elapsed time of the first audio playing device to obtain the synchronous playing time of the audio signal of the first audio playing device and the second audio playing device.

In a specific example, the audio providing device is a mobile phone terminal, the first audio playing device is a master Bluetooth earphone of a TWS Bluetooth earphone, the second audio playing device is a slave Bluetooth earphone of the TWS Bluetooth earphone, the master Bluetooth earphone is Bluetoothed with the mobile phone terminal via the first connected isochronous stream communication link, and the slave Bluetooth earphone is Bluetoothed with the mobile phone terminal via the second connected isochronous stream communication link. Time when the master Bluetooth earphone and the mobile phone terminal are accessed to the first connected isochronous stream communication link is different from time when the slave Bluetooth earphone and the mobile phone terminal are accessed to the second connected isochronous stream communication link. Further, after the master Bluetooth earphone and the mobile phone terminal are accessed to the first connected isochronous stream communication link, and after the slave Bluetooth earphone and the mobile phone terminal are accessed to the second connected isochronous stream communication link, a synchronization point where the first connected isochronous stream communication link is located is aligned with a synchronization point where the second connected isochronous stream communication link is located. Therefore, in the case where the m-th synchronization point where the second connected isochronous stream communication link is currently located is aligned with the n-th synchronization point where the first connected isochronous stream communication link is currently located, a first difference between first elapsed time and second elapsed time is equal to a multiple of a time interval between two adjacent synchronization points, where the first elapsed time is elapsed time of native Bluetooth time of the slave Bluetooth earphone when the second connected isochronous stream communication link is currently at the m-th synchronization point relative to native Bluetooth time of the slave Bluetooth earphone when the second connected isochronous stream communication link is at the first synchronization point, and the second elapsed time is elapsed time of native Bluetooth time of the master Bluetooth earphone when the first connected isochronous stream communication link is currently at the n-th synchronization point relative to native Bluetooth time of the master Bluetooth earphone when the first connected isochronous stream communication link is at the first synchronization point, and the time interval between two adjacent synchronization points is a multiple of the isochronous interval. Then, it can be inferred that the first difference is equal to the multiple of the isochronous interval. An event count parameter of the slave Bluetooth earphone is used for counting isochronous intervals when the slave Bluetooth earphone is linked with the second connected isochronous stream communication link, and an event count parameter of the master Bluetooth earphone is used for counting isochronous intervals when the master Bluetooth earphone is linked with the first connected isochronous stream communication link, thereby obtaining, based on the characteristics of the synchronous mode of the Bluetooth low energy protocol, the multiple of the isochronous interval as a second difference between the event count parameter of the slave Bluetooth earphone and the event count parameter of the master Bluetooth earphone. Thus, it can be obtained that the first difference is equal to a product of the second difference and the isochronous interval, and then it can be obtained that the first elapsed time is equal to the second elapsed time plus a product of the second difference and the isochronous interval. Therefore, the slave Bluetooth earphone can determine the synchronous playing time of the audio signal of the master Bluetooth earphone and the slave Bluetooth earphone based on the first elapsed time, while the master Bluetooth earphone can receive the event count parameter of the slave Bluetooth earphone from the slave Bluetooth earphone, compute the second difference based on the event count parameter of the slave Bluetooth earphone, then compute the product of the second difference and the isochronous interval, then add the product of the second difference and the isochronous interval to the second elapsed time, and finally determine the synchronous playing time of the audio signal of the master Bluetooth earphone and the slave Bluetooth earphone based on an adding result.

In some alternative embodiments, a specific implementation of playing the audio signal provided by the audio providing device synchronously with the second audio playing device based on the synchronous playing time is similar to the specific implementation of the playing the audio signal provided by the audio providing device synchronously with the second audio playing device based on the synchronous playing time in step S203 of the above Embodiment II. The description will not be repeated here.

In a specific example, when the second audio playing device determines the playing start time and the playing period of the audio signal based on the audio synchronous playing request, the second audio playing device acquires elapsed time of the second audio playing device based on the audio synchronous playing request; determines the native synchronous playing time of the audio signal of the first audio playing device and the second audio playing device based on the elapsed time of the second audio playing device; and determines the playing start time and the playing period of the audio signal based on the native synchronous playing time. Therefore, the elapsed time of the second audio playing device is elapsed time of the native Bluetooth time of the second audio playing device when the second connected isochronous stream communication link is currently at the m-th synchronization point relative to the native Bluetooth time of the second audio playing device when the second connected isochronous stream communication link is at the first synchronization point in the case where the m-th synchronization point where the second connected isochronous stream communication link is currently located is aligned with the n-th synchronization point where the first connected isochronous stream communication link is currently located.

Figure 3E:
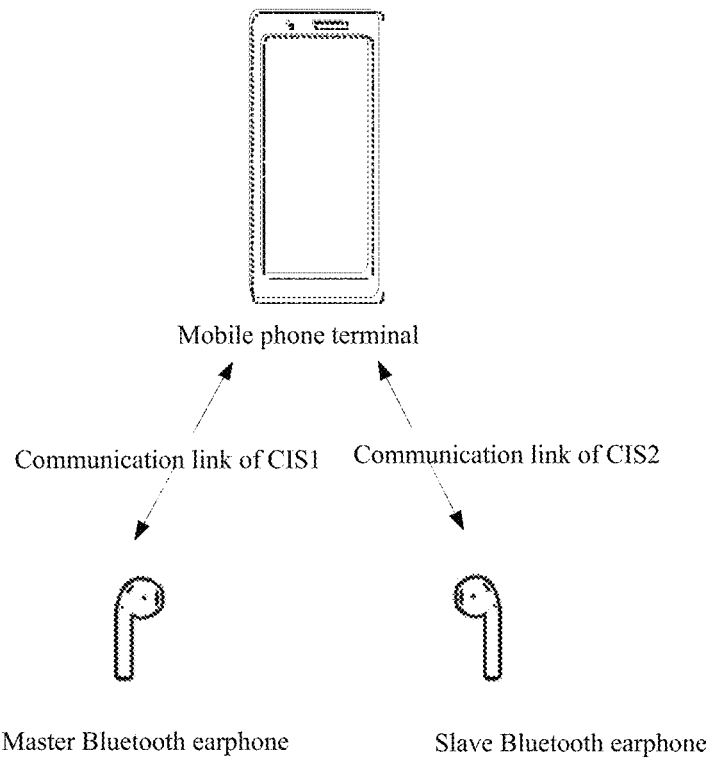
FIG. 3E is a schematic diagram of a first audio playing device and a second audio playing device provided in Embodiment III of the present disclosure being in a synchronous mode of Bluetooth low energy protocol.

In a specific example, as shown in FIG. 3E, the audio providing device is a mobile phone terminal, the first audio playing device is a master Bluetooth earphone of a TWS Bluetooth earphone, and the second audio playing device is a slave Bluetooth earphone of the TWS Bluetooth earphone. The mobile phone terminal establishes a connected isochronous stream communication link with the master Bluetooth earphone, and establishes a connected isochronous stream communication link with the slave Bluetooth earphone, where the connected isochronous stream communication link established between the mobile phone terminal and the master Bluetooth earphone is a communication link of the connected isochronous stream 1, and the connected isochronous stream communication link established between the mobile phone terminal and the slave Bluetooth earphone is a communication link of the connected isochronous stream 2. A process of synchronously playing audio by the master Bluetooth earphone and the slave Bluetooth earphone is similar to the process of the synchronously playing audio by the master Bluetooth earphone and the slave Bluetooth earphone described for step S303 in this embodiment. The description will not be repeated here.

Figure 3F:
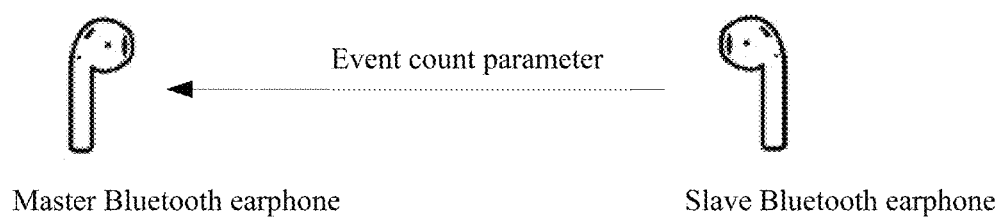
FIG. 3F is a schematic diagram of an alternative event count parameter of the first audio playing device and the second audio playing device provided in Embodiment III of the present disclosure.

In a specific example, as shown in FIG. 3F, the audio providing device is a mobile phone terminal, the first audio playing device is a master Bluetooth earphone of a TWS Bluetooth earphone, the second audio playing device is a slave Bluetooth earphone of the TWS Bluetooth earphone, the master Bluetooth earphone is Bluetoothed with the mobile phone terminal via the first connected isochronous stream communication link, and the slave Bluetooth earphone is Bluetoothed with the mobile phone terminal via the second connected isochronous stream communication link. If the m-th synchronization point where the second connected isochronous stream communication link is currently located is aligned with the n-th synchronization point where the first connected isochronous stream communication link is currently located, the slave Bluetooth earphone can determine the synchronous playing time of the audio signal of the master Bluetooth earphone and the slave Bluetooth earphone based on the first elapsed time, while the master Bluetooth earphone can receive the event count parameter of the slave Bluetooth earphone from the slave Bluetooth earphone, and determine the synchronous playing time based on the event count parameter of the slave Bluetooth earphone and the second elapsed time. The first elapsed time is the elapsed time of the native Bluetooth time of the slave Bluetooth earphone when the second connected isochronous stream communication link is currently at the m-th synchronization point relative to the native Bluetooth time of the slave Bluetooth earphone when the second connected isochronous stream communication link is at the first synchronization point, and the second elapsed time is the elapsed time of the native Bluetooth time of the master Bluetooth earphone when the first connected isochronous stream communication link is currently at the n-th synchronization point relative to the native Bluetooth time of the master Bluetooth earphone when the first connected isochronous stream communication link is at the first synchronization point. After obtaining the synchronous playing time, the master Bluetooth earphone and the slave Bluetooth earphone each generate a periodic level signal or a periodic pulse signal for synchronous playing of the audio signal of the master Bluetooth earphone and the slave Bluetooth earphone based on the determined synchronous playing time, and synchronously play the audio signal based on the periodic level signal or the periodic pulse signal.

In this embodiment, elapsed time of native Bluetooth time of the first audio playing device when the first connected isochronous stream communication link is at an n-th synchronization point relative to native Bluetooth time of the first audio playing device when the first connected isochronous stream communication link is at a first synchronization point is determined, such that the first audio providing device can obtain absolute time of the second audio playing device using isochronous characteristics of the connected isochronous stream communication links, and then determine synchronous playing time of an audio signal of the first audio playing device and the second audio providing device based on absolute time of the second audio playing device. In addition, native Bluetooth time of the first connected isochronous stream communication link at the n-th synchronization point and native Bluetooth time of the first connected isochronous stream communication link at the first synchronization point are each obtained based on Bluetooth time of a Bluetooth controller in the first audio playing device, and a clock accurate to microsecond is provided inside the Bluetooth controller, thereby effectively improving the precision of synchronous playing of audio by the first audio playing device and the second audio playing device without the need for additionally occupying an antenna to receive and send a synchronous audio playing signal.

Embodiment IV of the present disclosure provides an apparatus for synchronously playing audio. The apparatus includes: a timer communicatively connected to a Bluetooth controller, and a first audio playing module communicatively connected to the timer. The timer is configured to: determine native Bluetooth time of the first audio playing module based on status information of the Bluetooth controller and Bluetooth time acquired from the Bluetooth controller, wherein the status information is information indicative of a state that the Bluetooth controller is in; and estimate, based on the native Bluetooth time of the first audio playing module and offset time of the native Bluetooth time of the first audio playing module relative to native Bluetooth time of a second audio playing module, absolute time of the second audio playing module; or estimate, based on the native Bluetooth time of the first audio playing module, and offset time of the native Bluetooth time of the first audio playing module relative to native Bluetooth time of an audio providing device, absolute time of the audio providing device. The first audio playing module and the second audio playing module are Bluetoothed with the audio providing device. The first audio playing module is configured to play an audio signal provided by the audio providing device synchronously with the second audio playing module based on the estimated absolute time. The apparatus further includes the Bluetooth controller communicatively connected to the timer. Thus, the timer estimates absolute time of a second audio playing module or an audio providing device based on native Bluetooth time of the first audio playing module, such that the first audio playing module can obtain the absolute time of the second audio playing module or the audio providing device, and then play an audio signal provided by the audio providing device synchronously with the second audio playing module based on the estimated absolute time. In addition, the native Bluetooth time of the first audio playing module is obtained based on Bluetooth time of the Bluetooth controller, and a clock accurate to microsecond is provided inside the Bluetooth controller, thereby effectively improving the precision of synchronous playing of audio by the first audio playing module and the second audio playing module without the need for additionally occupying an antenna to receive and send a synchronous audio playing signal.

Figure 4:
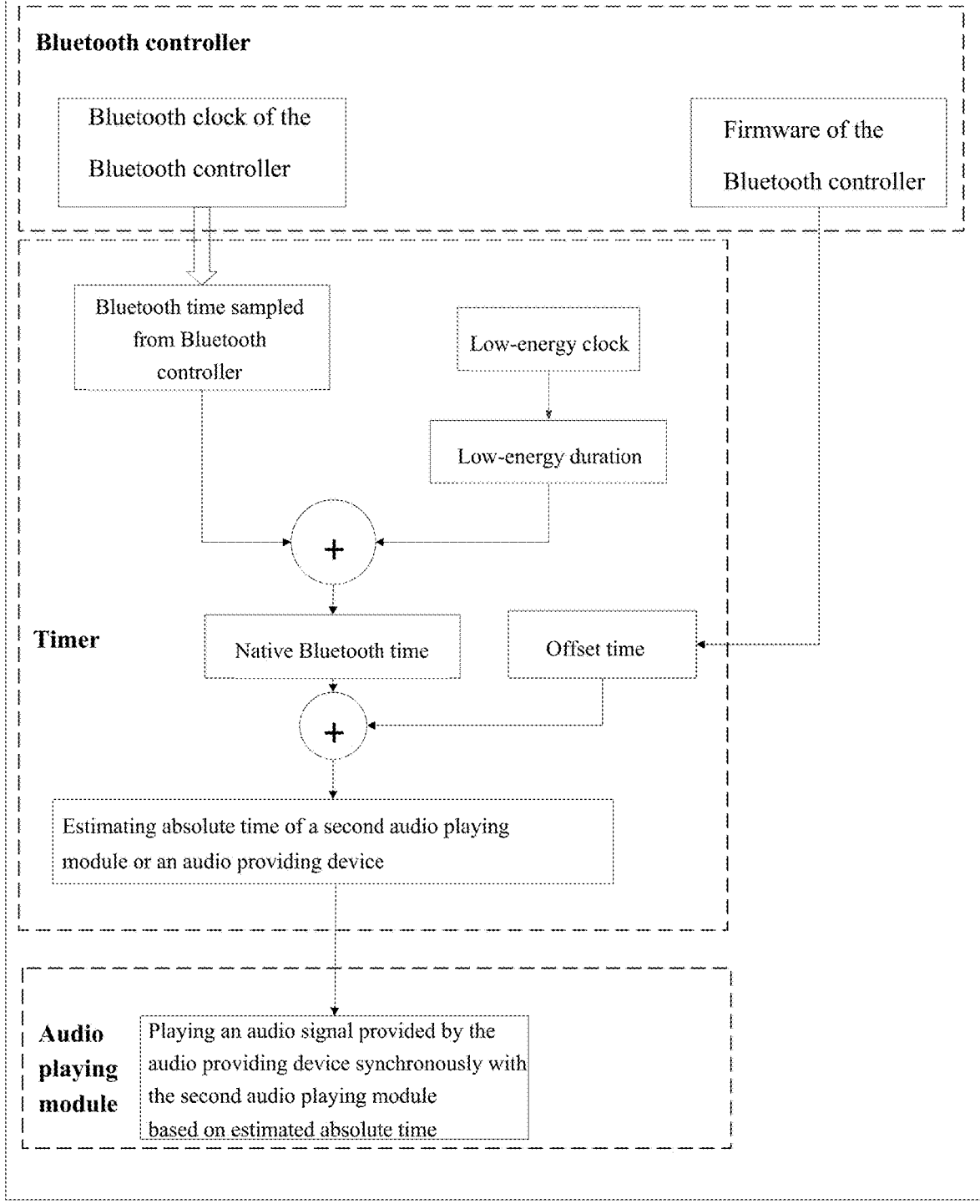
FIG. 4 is a schematic structural diagram of an apparatus for synchronously playing audio provided in Embodiment IV of the present disclosure.

In a specific example, as shown in FIG. 4, an audio playing device of the first audio playing module is Bluetoothed with an audio playing device of the second audio playing module. An apparatus for synchronously playing audio is provided inside the audio playing device. The apparatus for synchronously playing audio includes a Bluetooth controller, a timer communicatively connected to the Bluetooth controller, and a first audio playing module communicatively connected to the timer. When status information of the Bluetooth controller is information indicating that the Bluetooth controller is in an operating state, the timer determines Bluetooth time sampled from the Bluetooth controller as native Bluetooth time of the first audio playing module. When the status information of the Bluetooth controller is information indicating that the Bluetooth controller is in a dormant state, the timer determines a result of adding a low-energy duration sampled from the low-energy clock to Bluetooth time sampled last time from the Bluetooth controller as the native Bluetooth time of the first audio playing module. After obtaining the native Bluetooth time of the first audio playing module, the timer acquires offset time of the native Bluetooth time of the first audio playing module relative to native Bluetooth time of the second audio playing module from firmware of the Bluetooth controller, and adds the offset time to the native Bluetooth time of the first audio playing module, to estimate the native Bluetooth time of the second audio playing module. After estimating the native Bluetooth time of the second audio playing module, the timer determines the estimated absolute time of the second audio playing module as the native Bluetooth time of the second audio playing module, and sends the estimated native Bluetooth time of the second audio playing module to the first audio playing module. The first audio playing module performs a modulo operation on the estimated native Bluetooth time of the second audio playing module to obtain synchronous playing time of an audio signal of the first audio playing module and the second audio playing module, generates a periodic level signal or a periodic pulse signal for synchronous playing of the audio signal of the first audio playing module and the second audio playing module based on the synchronous playing time, and finally plays the audio signal provided by the audio providing device synchronously with the second audio playing module based on the periodic level signal or the periodic pulse signal.

Embodiment V of the present disclosure provides an apparatus for synchronously playing audio. The apparatus includes: a timer communicatively connected to a Bluetooth controller, and a first audio playing module communicatively connected to the timer. The timer is configured to: determine native Bluetooth time of the first audio playing module based on status information of the Bluetooth controller and Bluetooth time acquired from the Bluetooth controller, wherein the status information is information indicative of a state that the Bluetooth controller is in; estimate, based on the native Bluetooth time of the first audio playing module and offset time of the native Bluetooth time of the first audio playing module relative to native Bluetooth time of a second audio playing module, absolute time of the second audio playing module, and generate an audio playing synchronous signal based on the estimated absolute time; or estimate, based on the native Bluetooth time of the first audio playing module, and offset time of the native Bluetooth time of the first audio playing module relative to native Bluetooth time of an audio providing device, absolute time of the audio providing device, and generate a synchronous audio playing signal based on the estimated absolute time. The first audio playing module and the second audio playing module are Bluetoothed with the audio providing device. The first audio playing module is configured to play an audio signal provided by the audio providing device synchronously with the second audio playing module based on the synchronous audio playing signal. The synchronous audio playing signal may be a periodic level signal or a periodic pulse signal, and the apparatus further includes the Bluetooth controller communicatively connected to the timer. Thus, the timer estimates absolute time of a second audio playing module or an audio providing device based on native Bluetooth time of the first audio playing module, such that the timer can obtain a synchronous audio playing signal of the first audio playing module and the second audio playing module, and then the first audio playing module plays an audio signal provided by the audio providing device synchronously with the second audio playing module based on the synchronous audio playing signal. In addition, the native Bluetooth time of the first audio playing module is obtained based on Bluetooth time of the Bluetooth controller, and a clock accurate to microsecond is provided inside the Bluetooth controller, thereby effectively improving the precision of synchronous playing of audio by the first audio playing module and the second audio playing module without the need for additionally occupying an antenna to receive and send the synchronous audio playing signal.

Figure 5:
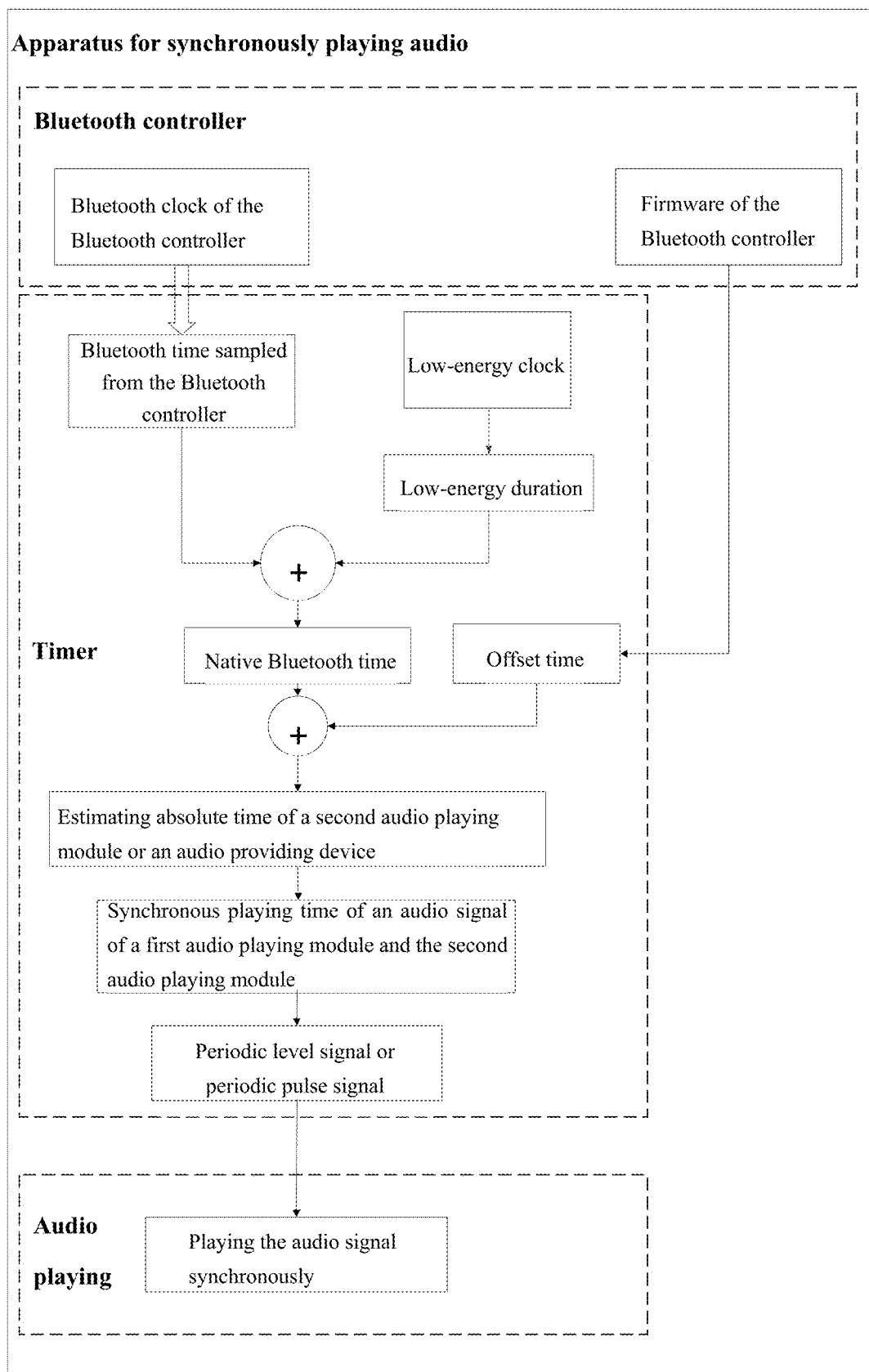
FIG. 5 is a schematic structural diagram of an apparatus for synchronously playing audio provided in Embodiment V of the present disclosure.

In a specific example, as shown in FIG. 5, an audio playing device of the first audio playing module is Bluetoothed with an audio playing device of the second audio playing module. Different from the process shown in FIG. 4, the timer does not send the estimated native Bluetooth time of the second audio playing module to the first audio playing module, but performs a modulo operation on the estimated native Bluetooth time of the second audio playing module to obtain synchronous playing time of an audio signal of the first audio playing module and the second audio playing module, generates a periodic level signal or a periodic pulse signal for synchronous playing of the audio signal of the first audio playing module and the second audio playing module based on the synchronous playing time, and finally sends the periodic level signal or the periodic pulse signal to the first audio playing module. The first audio playing module plays an audio signal provided by the audio providing device synchronously with the second audio playing module based on the periodic level signal or the periodic pulse signal.

Figure 6:
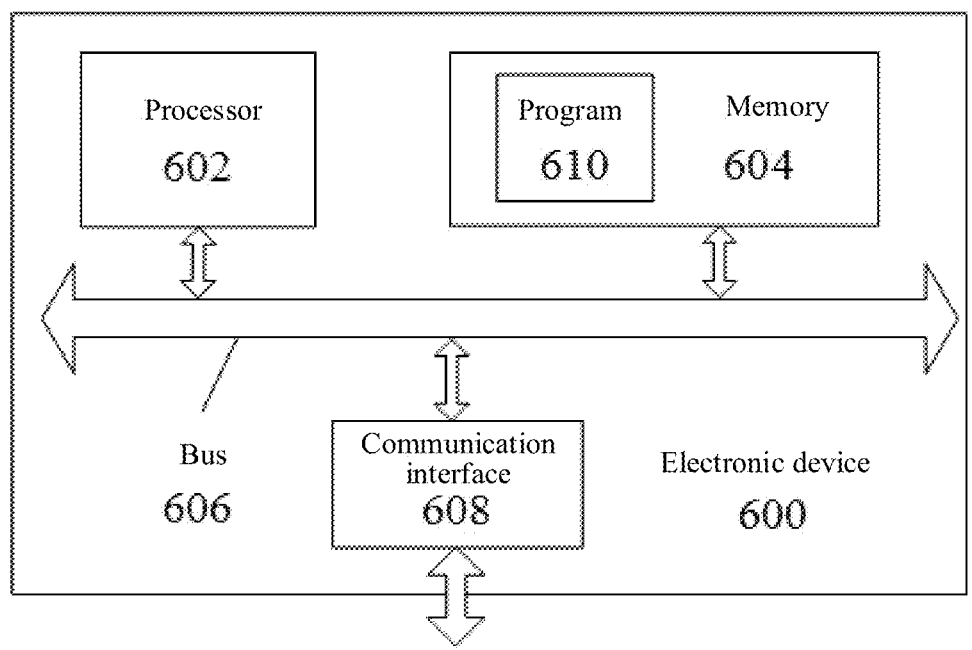
FIG. 6 is a schematic structural diagram of an electronic device provided in Embodiment VI of the present disclosure.

Based on the method for synchronously playing audio described in the above embodiments, Embodiment VI of the present disclosure provides an electronic device configured to execute the method for synchronously playing audio described in the above embodiments. As shown in FIG. 6, the electronic device 600 includes: at least one processor 602, a memory 604, a bus 606, and a communication interface 608.

In the figure:

The processor 602, the communication interface 608, and the memory 604 complete communication with each other through the communication bus 606.

The communication interface 608 is configured to communicate with other devices.

The processor 602 is configured to execute a program 610, and specifically can execute relevant steps in the method for synchronously playing audio described in the above Embodiment I to Embodiment III.

Specifically, the program 610 may include program code. The program code includes computer operation instructions.

The processor 602 may be a central processing unit CPU, or an Application Specific Integrated Circuit (ASIC), or one or more integrated circuits configured to implement embodiments of the present disclosure. The one or more processors included in the electronic device may be processors of a same type, e.g., one or more CPUs; or may be processors of different types, e.g., one or more CPUs and one or more ASICs.

The memory 604 is configured to store the program 610. The memory 604 may include a high-speed RAM memory, and may also include a non-volatile memory, e.g., at least one disk memory.

Based on the method for synchronously playing audio described in the above Embodiment I to Embodiment III, an embodiment of the present disclosure provides a computer-readable storage medium, storing a computer program thereon. The program, when executed by a processor, implements the method for synchronously playing audio as described in the above Embodiment I to Embodiment III.

A computing apparatus and the electronic device in the embodiments of the present disclosure exist in various forms, including but not limited to:

a mobile communication device: Such a device is characterized by having mobile communication functions, and is mainly intended to provide voice and data communication. Such a terminal includes: a smart phone (e.g., an iPhone), a multimedia phone, a functional phone, a low-end phone, and the like.

an ultra-mobile personal computer device: Such a device belongs to a category of personal computers, has computing and processing functions, and generally also has the characteristics of mobile Internet access. Such a terminal includes: a device, such as a PDA, a MID, and a UMPC, e.g., an iPad.

a portable entertainment device: Such a device can display and play multimedia contents. Such a device includes: an audio player, a video player (e.g., an iPod), a handheld game player, an e-book, a smart toy, and a portable vehicle navigation device.

other electronic devices having data interaction functions.

So far, specific embodiments of this subject matter have been described. Other embodiments fall within the scope of the appended claims. In some cases, actions disclosed in the appended claims may be performed in different orders and can still achieve desired results. In addition, the processes depicted in the figures do not necessarily require the shown particular order or sequential order, to achieve the desired results. In some embodiments, multitasking and parallel processing may be advantageous.

The controller may be implemented in any suitable manner. For example, the controller may take the form of a microprocessor or a processor and a computer-readable medium storing computer-readable program code (such as software or firmware) executable by the (micro)processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may also be implemented as a part of the memory control logic. Those skilled in the art also know that in addition to implementing the controller in a manner of purely computer-readable program code, it is completely possible to logically programme the process steps such that the controller implements a same function in the form of a logic gate, a switch, an application specific integrated circuit, a programmable logic controller, an embedded microcontroller, or the like. Therefore, such a controller may be regarded as a hardware component, and an apparatus included therein and configured to implement various functions may also be regarded as a structure within the hardware component. Or even, it may be regarded that the apparatus configured to implement various functions may be a software module for implementing the method, or may be the structure within the hardware component.

The system, apparatus, modules, or units illustrated in the above embodiments may be specifically implemented by a computer chip or entity, or by a product having a function. A typical implementing device is a computer. Specifically, the computer, e.g., may be a personal computer, a laptop computer, a cellular phone, a camera phone, a smart phone, a personal digital assistant, a medium player, a navigation device, an e-mail device, a game console, a tablet computer, a wearable device, or a combination of any device of these devices.

For ease of description, when the above apparatus is described, the apparatus is divided into various units based on functions, and then the units are described respectively. Of course, when the present disclosure is implemented, the functions of the units can be implemented in a same piece or more pieces of software and/or hardware.

Those skilled in the art should understand that the embodiments of the present disclosure may be provided as a method, a system, or a computer program product. Accordingly, the present disclosure may take the form of an entirely hardware embodiment, an entirely software embodiment, or an embodiment combining software and hardware. Further, the present disclosure may take the form of a computer program product embodied on one or more computer-readable storage mediums (including, but not limited to, a disk memory, a CD-ROM, an optical memory, and the like) having computer-usable program code embodied thereon.

The present disclosure is described with reference to the flowcharts and/or block diagrams of the method, device (system), and computer program product according to the embodiments of the present disclosure. It should be understood that each process and/or block in the flow charts and/or block diagrams as well as combinations of processes and/or blocks in the flow charts and/or block diagrams may be implemented by computer program instructions. The computer program instructions may be provided to a processor of a general-purpose computer, a special-purpose computer, an embedded processing machine, or other programmable data processing devices to produce a machine, such that the instructions executed via the processor of the computer or other programmable data processing devices create an apparatus for implementing the functions specified in one or more processes in the flow charts and/or one or more blocks in the block diagrams.

These computer program instructions may also be stored in a computer-readable memory that can direct a computer or other programmable data processing devices to function in a particular manner, such that the instructions stored in the computer-readable memory produce an article of manufacture including an instruction apparatus which implements the functions specified in one or more processes in the flow charts and/or one or more blocks in the block diagrams.

The computer program instructions may also be loaded onto a computer or other programmable data processing devices, to cause a series of operational steps to be executed on the computer or other programmable devices, to produce a computer implemented process, such that the instructions executed on the computer or other programmable devices provide steps for implementing the functions specified in one or more processes in the flow charts and/or one or more blocks in the block diagrams.

In a typical configuration, a computing device includes one or more processors (CPU), an input/output interface, a network interface, and an internal memory.

The internal memory may include forms, such as a volatile memory, a random-access memory (RAM), and/or a nonvolatile memory, e.g., a read-only memory (ROM) or a flash RAM, in a computer-readable medium. The internal memory is an example of the computer-readable medium.

The computer-readable medium includes permanent and non-permanent mediums, removable and non-removable mediums, and information storage may be implemented by any method or technology. The information may be a computer-readable instruction, a data structure, a program module, or other data. Examples of the computer storage medium include, but are not limited to, a phase-change random-access memory (PRAM), a static random-access memory (SRAM), a dynamic random-access memory (DRAM), a random-access memory (RAM) of other type, a read-only memory (ROM), an electrically erasable programmable read-only memory (EEPROM), a flash RAM or other internal memory technology, a compact disc read-only memory (CD-ROM), a digital versatile disc (DVD) or other optical storage, a magnetic cassette tape, and a magnetic tape or disk storage or other magnetic storage devices, or any other non-transmission medium, which may be configured to store information accessible to a computing device. As defined herein, the computer-readable medium excludes transitory media, e.g., a modulated data signal or carrier wave.

It should be further noted that the terms such as "comprising," "including" or any other variation thereof are intended to cover non-exclusive inclusions, such that a process, a method, an article, or a device that includes a series of elements not only includes those elements, but also includes other elements that are not explicitly listed, or further includes elements that are inherent to such process, method, article, or device. An element defined by the wording "comprises a . . . " does not, without more constraints, preclude the existence of other identical elements in the process, the method, the article, or the device that includes the element.

Those skilled in the art should understand that the embodiments of the present disclosure may be provided as a method, a system, or a computer program product. Accordingly, the present disclosure may take the form of an entirely hardware embodiment, an entirely software embodiment, or an embodiment combining software and hardware. Further, the present disclosure may take the form of a computer program product embodied on one or more computer-readable storage mediums (including, but not limited to, a disk memory, a CD-ROM, an optical memory, and the like) having computer-usable program code embodied thereon.

The present disclosure may be described in a general context of computer-executable instructions executed by a computer, e.g., program modules. Generally, the program modules include routines, programs, objects, components, data structures, etc. that execute specific tasks or implement specific abstract data types. The present disclosure may also be practiced in distributed computing environments. In these distributed computing environments, remote processing devices connected through a communication network execute tasks. In a distributed computing environment, the program modules may be located in local and remote computer storage mediums including storage devices.

The embodiments in the present specification are described progressively, identical or similar portions between the embodiments may be mutually referred to, and differences of each embodiment from other embodiments are mainly described in the embodiment. In particular, embodiments of the system are substantially similar to embodiments of the method, and therefore are relatively simply described. A part of description of the embodiments of the method may be referred to for relevant parts.

The above description merely provides embodiments of the present disclosure, and is not intended to limit the present disclosure. For those skilled in the art, the present disclosure may have various modifications and alterations. Any modification, equivalent replacement, improvement, and the like made within the spirit and principles of the present disclosure should be included within the scope of the appended claims of the present disclosure.

What is claimed is:

1. A method for synchronously playing audio, being applied to a first audio playing device, the method comprising:

acquiring status information of a Bluetooth controller in the first audio playing device and Bluetooth time from the Bluetooth controller in the first audio playing device, and determining native Bluetooth time of the first audio playing device based on the Bluetooth time acquired from the Bluetooth controller in the first audio playing device and the status information, wherein the status information is information indicative of a state that the Bluetooth controller in the first audio playing device is in;

estimating, based on the native Bluetooth time of the first audio playing device and offset time of the native Bluetooth time of the first audio playing device relative to native Bluetooth time of a second audio playing device, absolute time of the second audio playing device, and playing an audio signal provided by an audio providing device synchronously with the second audio playing device based on the estimated absolute time; or estimating, based on the native Bluetooth time of the first audio playing device, and offset time of the native Bluetooth time of the first audio playing device relative to native Bluetooth time of the audio providing device, absolute time of the audio providing device, and playing an audio signal provided by the audio providing device synchronously with the second audio playing device based on the estimated absolute time;

wherein the second audio playing device and the first audio playing device are paired and are Bluetoothed with the audio providing device.

2. The method according to claim 1, wherein the determining the native Bluetooth time of the first audio playing device based on the Bluetooth time acquired from the Bluetooth controller in the first audio playing device and the status information comprises:

determining, when the status information is information indicating that the Bluetooth controller is in an operating state, Bluetooth time sampled from the Bluetooth controller as the native Bluetooth time of the first audio playing device; and determining, when the status information is information indicating that the Bluetooth controller is in a dormant state, the native Bluetooth time of the first audio playing device based on a low-energy duration of the first audio playing device and Bluetooth time sampled last time from the Bluetooth controller, wherein the low-energy duration is a duration during which the Bluetooth controller is in the dormant state.

3. The method according to claim 1, wherein the first audio playing device and the second audio playing device are in a forwarding mode of classic Bluetooth protocol, and the estimating, based on the native Bluetooth time of the first audio playing device and the offset time of the native Bluetooth time of the first audio playing device relative to the native Bluetooth time of the second audio playing device, the absolute time of the second audio playing device comprises:

estimating the native Bluetooth time of the second audio playing device based on the native Bluetooth time of the first audio playing device and the offset time of the native Bluetooth time of the first audio playing device relative to the native Bluetooth time of the second audio playing device, and determining the estimated native Bluetooth time of the second audio playing device as the estimated absolute time.

4. The method according to claim 3, wherein the playing the audio signal provided by the audio providing device synchronously with the second audio playing device based on the estimated absolute time comprises:

performing a modulo operation on the estimated native Bluetooth time of the second audio playing device to obtain synchronous playing time of the audio signal of the first audio playing device and the second audio playing device; and playing the audio signal provided by the audio providing device synchronously with the second audio playing device based on the synchronous playing time.

5. The method according to claim 4, wherein the playing the audio signal provided by the audio providing device synchronously with the second audio playing device based on the synchronous playing time comprises:

sending an audio synchronous playing request to the second audio playing device based on the synchronous playing time, the audio synchronous playing request being used for causing the second audio playing device to determine playing start time and a playing period of the audio signal, and to generate a synchronous audio playing response to be sent to the first audio playing device based on the playing start time and the playing period of the audio signal;

receiving the playing start time and the playing period of the audio signal carried in the synchronous audio playing response from the second audio playing device, and generating a periodic level signal or a periodic pulse signal for synchronous playing of the audio signal of the first audio playing device and the second audio playing device; and playing the audio signal provided by the audio providing device synchronously with the second audio playing device based on the periodic level signal or the periodic pulse signal.

6. The method according to claim 3, wherein before the estimating the native Bluetooth time of the second audio playing device, the method comprises:

determining desired arrival time of desired Bluetooth data arriving at the first audio playing device from the second audio playing device;

determining a difference between the desired arrival time and actual arrival time of the desired Bluetooth data arriving at the first audio playing device from the second audio playing device; and determining the difference as the offset time of the native Bluetooth time of the first audio playing device relative to the native Bluetooth time of the second audio playing device.

7. The method according to claim 3, wherein the first audio playing device is a slave Bluetooth earphone, and/or the second audio playing device is a master Bluetooth earphone.

8. The method according to claim 1, wherein the first audio playing device and the second audio playing device are in a listening mode of the classic Bluetooth protocol, and the estimating, based on the native Bluetooth time of the first audio playing device and the offset time of the native Bluetooth time of the first audio playing device relative to the native Bluetooth time of the audio providing device, the absolute time of the audio providing device comprises:

estimating, based on the native Bluetooth time of the first audio playing device and the offset time of the native Bluetooth time of the first audio playing device relative to the native Bluetooth time of the audio providing device, the native Bluetooth time of the audio providing device, and determining the estimated native Bluetooth time of the audio providing device as the estimated absolute time.

9. The method according to claim 8, wherein the playing the audio signal provided by the audio providing device synchronously with the second audio playing device based on the estimated absolute time comprises:

performing a modulo operation on the estimated native Bluetooth time of the audio providing device to obtain synchronous playing time of the audio signal of the first audio playing device and the second audio playing device; and playing the audio signal provided by the audio providing device synchronously with the second audio playing device based on the synchronous playing time.

10. The method according to claim 9, wherein the playing the audio signal provided by the audio providing device synchronously with the second audio playing device based on the synchronous playing time comprises:

sending the audio synchronous playing request to the second audio playing device based on the synchronous playing time, the audio synchronous playing request being used for causing the second audio playing device to determine the playing start time and the playing period of the audio signal, and to generate the synchronous audio playing response to be sent to the first audio playing device based on the playing start time and the playing period of the audio signal;

receiving the playing start time and the playing period of the audio signal carried in the synchronous audio playing response from the second audio playing device, and generating a periodic level signal or a periodic pulse signal for synchronous playing of the audio signal of the first audio playing device and the second audio playing device; and playing the audio signal provided by the audio providing device synchronously with the second audio playing device based on the periodic level signal or the periodic pulse signal.

11. The method according to claim 8, wherein the first audio playing device and the second audio playing device are each a Bluetooth earphone, and/or the audio providing device is a mobile phone terminal.

12. The method according to claim 1, wherein the first audio playing device is Bluetoothed with the audio providing device via a first connected isochronous stream communication link, and the second audio playing device is Bluetoothed with the audio providing device via a second connected isochronous stream communication link, and the determining the native Bluetooth time of the first audio playing device based on the Bluetooth time acquired from the Bluetooth controller in the first audio playing device and the status information comprises:

determining the native Bluetooth time of the first audio playing device based on the status information of the Bluetooth controller in the first audio playing device and the Bluetooth time acquired from the Bluetooth controller in the first audio playing device when the first connected isochronous stream communication link is at an n-th synchronization point, wherein n is an integer more than or equal to 2.

13. The method according to claim 12, wherein the estimating, based on the native Bluetooth time of the first audio playing device and the offset time of the native Bluetooth time of the first audio playing device relative to the native Bluetooth time of the audio providing device, the absolute time of the audio providing device comprises:

determining, based on first native Bluetooth time of the first audio playing device, second native Bluetooth time of the first audio playing device, and the offset time of the native Bluetooth time of the first audio playing device relative to the native Bluetooth time of the audio providing device, elapsed time of the first native Bluetooth time relative to the second native Bluetooth time, and determining the elapsed time as the estimated absolute time, wherein the first native Bluetooth time is native Bluetooth time of the first audio playing device when the first connected isochronous stream communication link is at the n-th synchronization point, and the second native Bluetooth time is native Bluetooth time of the first audio playing device when the first connected isochronous stream communication link is at a first synchronization point.

14. The method according to claim 13, wherein the playing the audio signal provided by the audio providing device synchronously with the second audio playing device based on the estimated absolute time comprises:

determining, when a synchronization point of the second connected isochronous stream communication link is aligned with the n-th synchronization point of the first connected isochronous stream communication link, the synchronous playing time of the audio signal of the first audio playing device and the second audio playing device based on the elapsed time, and playing the audio signal provided by the audio providing device synchronously with the second audio playing device based on the synchronous playing time.

15. The method according to claim 14, wherein the determining the synchronous playing time of the audio signal of the first audio playing device and the second audio playing device based on the elapsed time comprises:

determining the synchronous playing time of the audio signal of the first audio playing device and the second audio playing device based on the elapsed time and a preconfigured maximum audio decoding duration.

16. The method according to claim 14, wherein the determining the synchronous playing time of the audio signal of the first audio playing device and the second audio playing device based on the elapsed time comprises:

determining the synchronous playing time of the audio signal of the first audio playing device and the second audio playing device based on the elapsed time and a second event count parameter received from the second audio playing device, wherein the second event count parameter is used for counting a number of isochronous intervals when the second audio playing device is linked with the second connected isochronous stream communication link.

17. The method according to claim 16, wherein the determining the synchronous playing time of the audio signal of the first audio playing device and the second audio playing device based on the elapsed time and the second event count parameter received from the second audio playing device comprises:

determining the synchronous playing time of the audio signal of the first audio playing device and the second audio playing device based on the elapsed time, a first event count parameter of the first audio playing device, the second event count parameter of the second audio playing device, and the isochronous intervals of the first connected isochronous stream communication link to which the first audio playing device is accessed, wherein the first event count parameter is used for counting a number of isochronous intervals when the first audio playing device is linked with the first connected isochronous stream communication link.

18. An apparatus for synchronously playing audio, comprising:

a timer communicatively connected to a Bluetooth controller, and a first audio playing module communicatively connected to the timer, the timer being configured to:

determine native Bluetooth time of the first audio playing module based on status information of the Bluetooth controller and Bluetooth time acquired from the Bluetooth controller in the first audio playing module, wherein the status information is information indicative of a state that the Bluetooth controller in the first audio playing module is in; and estimate, based on the native Bluetooth time of the first audio playing module and offset time of the native Bluetooth time of the first audio playing module relative to native Bluetooth time of a second audio playing module, absolute time of the second audio playing module; or estimate, based on the native Bluetooth time of the first audio playing module, and offset time of the native Bluetooth time of the first audio playing module relative to native Bluetooth time of an audio providing device, absolute time of the audio providing device, wherein the first audio playing module and the second audio playing module are Bluetoothed with the audio providing device; and the first audio playing module being configured to play an audio signal provided by the audio providing device synchronously with the second audio playing module based on the estimated absolute time.

19. The apparatus according to claim 18, wherein the apparatus further comprises the Bluetooth controller communicatively connected to the timer.

20. An electronic device, comprising an apparatus for synchronously playing audio, wherein the apparatus comprises:

a timer communicatively connected to a Bluetooth controller, and a first audio playing module communicatively connected to the timer, the timer being configured to:

determine native Bluetooth time of the first audio playing module based on status information of the Bluetooth controller and Bluetooth time acquired from the Bluetooth controller in the first audio playing module, wherein the status information is information indicative of a state that the Bluetooth controller in the first audio playing module is in; and estimate, based on the native Bluetooth time of the first audio playing module and offset time of the native Bluetooth time of the first audio playing module relative to native Bluetooth time of a second audio playing module, absolute time of the second audio playing module, and generate an audio playing synchronous signal based on the estimated absolute time; or estimate, based on the native Bluetooth time of the first audio playing module, and offset time of the native Bluetooth time of the first audio playing module relative to native Bluetooth time of an audio providing device, absolute time of the audio providing device, and generate the audio playing synchronous signal based on the estimated absolute time; wherein the first audio playing module and the second audio playing module are Bluetoothed with the audio providing device; and the first audio playing module being configured to play an audio signal provided by the audio providing device synchronously with the second audio playing module based on the estimated absolute time.

\* \* \* \* \*